US011792392B2

(12) United States Patent
Son et al.

(10) Patent No.: US 11,792,392 B2
(45) Date of Patent: *Oct. 17, 2023

(54) VIDEO ENCODING AND DECODING ACCELERATION UTILIZING IMU SENSOR DATA FOR CLOUD VIRTUAL REALITY

(71) Applicants: WILUS INSTITUTE OF STANDARDS AND TECHNOLOGY INC., Gyeonggi-do (KR); FOUNDATION FOR RESEARCH AND BUSINESS, SEOUL NATIONAL UNIVERSITY OF SCIENCE AND TECHNOLOGY, Seoul (KR)

(72) Inventors: Juhyung Son, Gyeonggi-do (KR); Fathan Adi Pranaya, Gyeonggi-do (KR); Jinsam Kwak, Gyeonggi-do (KR); Jihoon Yun, Seoul (KR)

(73) Assignees: WILUS INSTITUTE OF STANDARDS AND TECHNOLOGY INC., Gyeonggi-do (KR); FOUNDATION FOR RESEARCH AND BUSINESS, SEOUL NATIONAL UNIVERSITY OF SCIENCE AND TECHNOLOGY, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/717,073

(22) Filed: Apr. 9, 2022

(65) Prior Publication Data
US 2022/0232209 A1     Jul. 21, 2022

Related U.S. Application Data

(63) Continuation of application No. 17/504,479, filed on Oct. 18, 2021, now Pat. No. 11,546,582, which is a
(Continued)

(30) Foreign Application Priority Data

Sep. 4, 2019   (KR) .................... 10-2019-0109782

(51) Int. Cl.
*H04N 19/105*     (2014.01)
*H04N 19/103*     (2014.01)
(Continued)

(52) U.S. Cl.
CPC ......... *H04N 19/105* (2014.11); *H04N 19/103* (2014.11); *H04N 19/167* (2014.11);
(Continued)

(58) Field of Classification Search
None
See application file for complete search history.

(56) References Cited

U.S. PATENT DOCUMENTS 6,474,159 B1    11/2002  Foxlin et al.
10,192,133 B2 *  1/2019  Yang .................. G06V 10/245
(Continued)

FOREIGN PATENT DOCUMENTS

CN        102075760        5/2011
KR     10-2015-0002974     1/2015
(Continued)

OTHER PUBLICATIONS

Notice of Allowance dated Aug. 31, 2022 for U.S. Appl. No. 17/504,479.
(Continued)

*Primary Examiner* — Stefan Gadomski
(74) *Attorney, Agent, or Firm* — Ladas & Parry, LLP

(57) ABSTRACT

An encoding acceleration method of cloud VR (virtual reality) video, the method comprising: constructing a reference frame candidate for encoding of a current frame; selecting a specific reference frame among the reference
(Continued)

frame candidate based on a sensor data of IMU (Inertial Measurement Unit); selecting a prediction mode for encoding the current frame based on information included in the specific reference frame; and encoding the current frame based on the selected prediction mode.

16 Claims, 15 Drawing Sheets

Related U.S. Application Data continuation of application No. PCT/KR2020/011875, filed on Sep. 3, 2020.

(51) Int. Cl.
| | | |
|---|---|---|
| *H04N 19/167* | (2014.01) | |
| *H04N 19/176* | (2014.01) | |
| *H04N 19/52* | (2014.01) | |
| *H04N 19/597* | (2014.01) | |
| *H04N 19/40* | (2014.01) | |
| *H04N 19/70* | (2014.01) | |
| *H04N 13/332* | (2018.01) | |
| *G06F 3/01* | (2006.01) | |

(52) U.S. Cl.
CPC .......... *H04N 19/176* (2014.11); *H04N 19/52* (2014.11); *H04N 19/597* (2014.11); *G06F 3/012* (2013.01); *H04N 13/332* (2018.05); *H04N 19/40* (2014.11); *H04N 19/70* (2014.11)

(56) References Cited

U.S. PATENT DOCUMENTS

| | | | |
|---|---|---|---|
| 10,560,678 | B2 | 2/2020 | Lin et al. |
| 2006/0056511 | A1 | 3/2006 | Rehan et al. |
| 2014/0301467 | A1 | 10/2014 | Thirumalai et al. |
| 2017/0142337 | A1 | 5/2017 | Kokaram et al. |
| 2017/0214937 | A1 | 7/2017 | Lin et al. |
| 2017/0295356 | A1 | 10/2017 | Abbas et al. |
| 2017/0374385 | A1 | 12/2017 | Huang et al. |
| 2018/0007352 | A1 | 1/2018 | Chang et al. |
| 2018/0188032 | A1 | 7/2018 | Ramananda et al. |
| 2018/0225805 | A1* | 8/2018 | Brandt ................. H04N 23/661 |
| 2018/0262774 | A1 | 9/2018 | Lin et al. |
| 2018/0295400 | A1 | 10/2018 | Thomas et al. |
| 2018/0332301 | A1 | 11/2018 | Tian et al. |
| 2018/0364048 | A1 | 12/2018 | Cook et al. |
| 2019/0007679 | A1 | 1/2019 | Coban et al. |
| 2019/0014326 | A1 | 1/2019 | Tanner et al. |
| 2019/0045212 | A1 | 2/2019 | Rose et al. |
| 2019/0045213 | A1 | 2/2019 | Rant et al. |
| 2019/0080483 | A1 | 3/2019 | Mammou et al. |
| 2019/0081638 | A1 | 3/2019 | Mammou et al. |
| 2019/0082183 | A1 | 3/2019 | Shih et al. |
| 2019/0087978 | A1* | 3/2019 | Tourapis .................. G06T 9/00 |
| 2019/0087979 | A1* | 3/2019 | Mammou ............... G06T 9/004 |
| 2019/0156518 | A1* | 5/2019 | Mammou ............... G06T 5/006 |
| 2019/0166323 | A1 | 5/2019 | Saito et al. |
| 2019/0208200 | A1 | 7/2019 | Galpin et al. |
| 2019/0253732 | A1 | 8/2019 | Hendry et al. |
| 2019/0260989 | A1 | 8/2019 | Racape et al. |
| 2019/0295324 | A1 | 9/2019 | Servant et al. |
| 2019/0311499 | A1 | 10/2019 | Mammou et al. |
| 2019/0311501 | A1 | 10/2019 | Mammou et al. |
| 2019/0311502 | A1* | 10/2019 | Mammou ............... G06T 17/00 |
| 2019/0335203 | A1 | 10/2019 | Li et al. |
| 2019/0349598 | A1 | 11/2019 | Aminlou et al. |
| 2020/0007867 | A1* | 1/2020 | Tourapis .............. H04N 19/156 |
| 2020/0021847 | A1* | 1/2020 | Kim ..................... H04N 19/597 |
| 2020/0043133 | A1 | 2/2020 | Boyce |
| 2020/0045286 | A1 | 2/2020 | Boyce |
| 2020/0045288 | A1 | 2/2020 | Boyce |
| 2020/0045342 | A1 | 2/2020 | Bordes et al. |
| 2020/0053392 | A1 | 2/2020 | Hannuksela |
| 2020/0154137 | A1 | 5/2020 | Fleurea et al. |
| 2020/0169753 | A1 | 5/2020 | Xiu et al. |
| 2020/0217937 | A1 | 7/2020 | Mammou et al. |
| 2020/0219283 | A1* | 7/2020 | Nishikawa .............. G06T 5/001 |
| 2020/0244996 | A1 | 7/2020 | Iyer et al. |
| 2020/0249748 | A1 | 8/2020 | Rangathan et al. |
| 2020/0249749 | A1 | 8/2020 | Akman et al. |
| 2020/0260063 | A1 | 8/2020 | Hannuksela |
| 2020/0389639 | A1 | 12/2020 | Rhyu |
| 2021/0056720 | A1* | 2/2021 | Uchida ..................... G06T 7/73 |
| 2021/0337202 | A1 | 10/2021 | Xiu et al. |
| 2021/0360275 | A1 | 11/2021 | Yang et al. |
| 2021/0385454 | A1 | 12/2021 | Fleureau et al. |

FOREIGN PATENT DOCUMENTS

| | | | |
|---|---|---|---|
| KR | 10-2018-0086218 | 7/2018 | |
| KR | 10-2019-0015093 | 2/2019 | |
| KR | 10-2019-0058624 | 5/2019 | |
| WO | 2015/172227 | 11/2015 | |
| WO | WO-2019026789 A1 * | 2/2019 | .......... G01B 11/002 |
| WO | 2021/045536 | 3/2021 | |

OTHER PUBLICATIONS

Julius Kammerl et al.: "Real-time Compression of Point Cloud Streams", 2012 IEEE International Conference on Robotics and Automation, May 14-18, 2012, pp. 778-785.

Gil Elbaz et al.: "3D Point Cloud Registration for Localization using a Deep Neural Network Auto-Encoder", Proceedings of the IEEE Conference on Computer Vision and Pattern Recognition (CVPR), 2017, pp. 4631-4640.

Notice of Allowance dated Oct. 21, 2022 for Korean Patent Application No. 10-2022-7010529 and its English translation from Global Dossier.

International Search Report for PCT/KR2020/011875 dated Jan. 5, 2021 (now published as WO 2021/045536).

Written Opinion of the International Searching Authority for PCT/KR2020/011875 dated Jan. 5, 2021 (now published as WO 2021/045536).

Office Action dated Jun. 24, 2022 for Korean Patent Application No. 10-2022-7010529 and its English translation provided by the Applicant's foreign counsel.

Office Action dated May 4, 2022 for U.S. Appl. No. 17/504,479.

* cited by examiner

[Fig. 1]
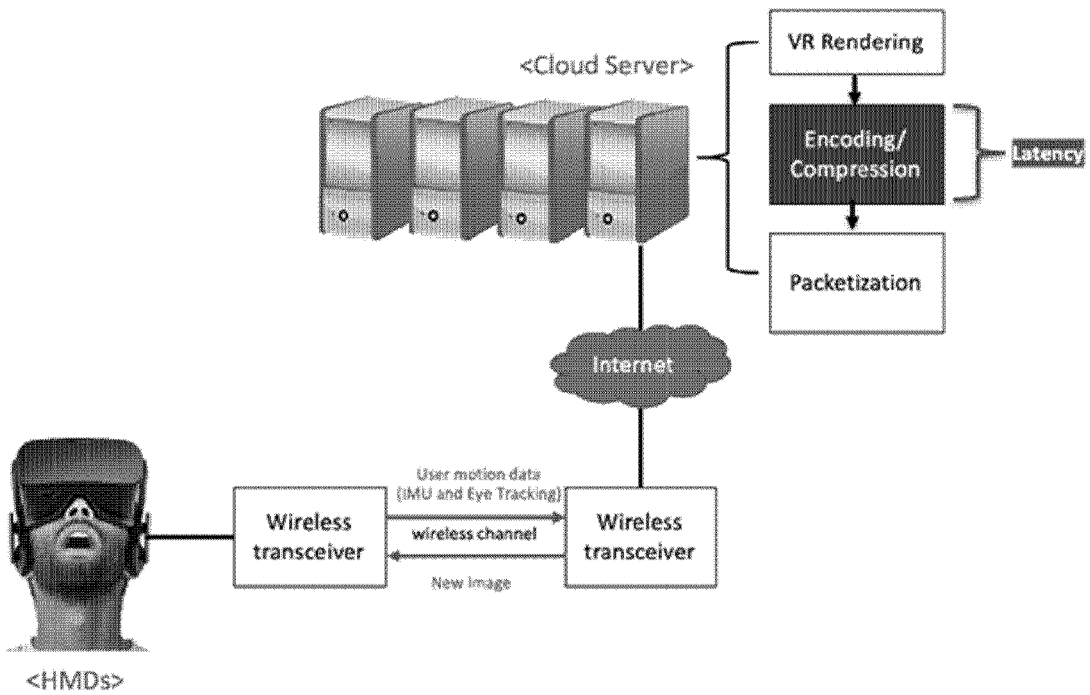
[Fig. 2]
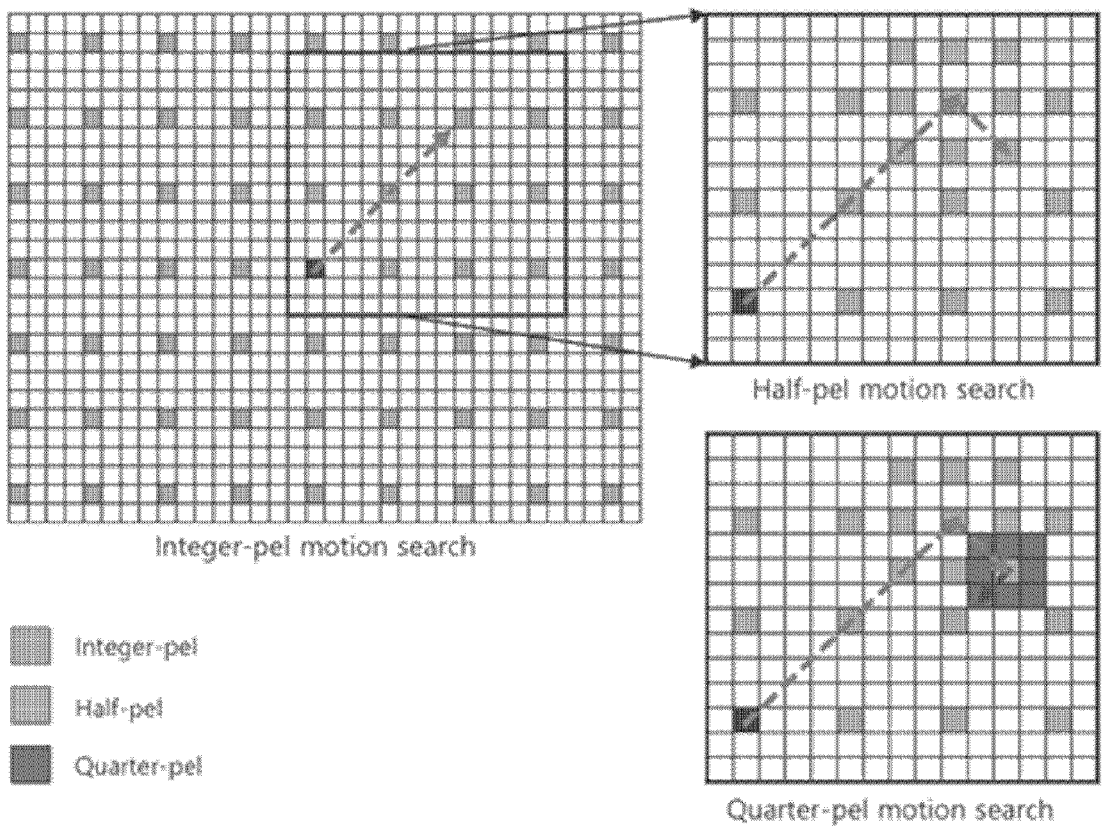

[Fig. 3]
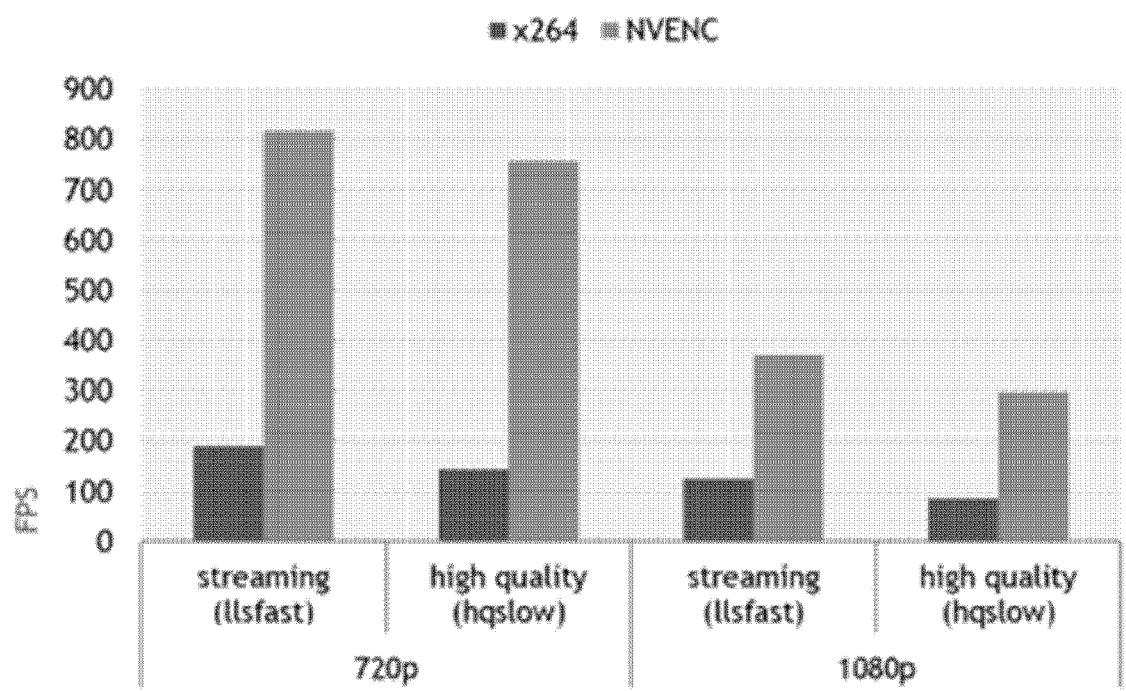

[Fig. 4]
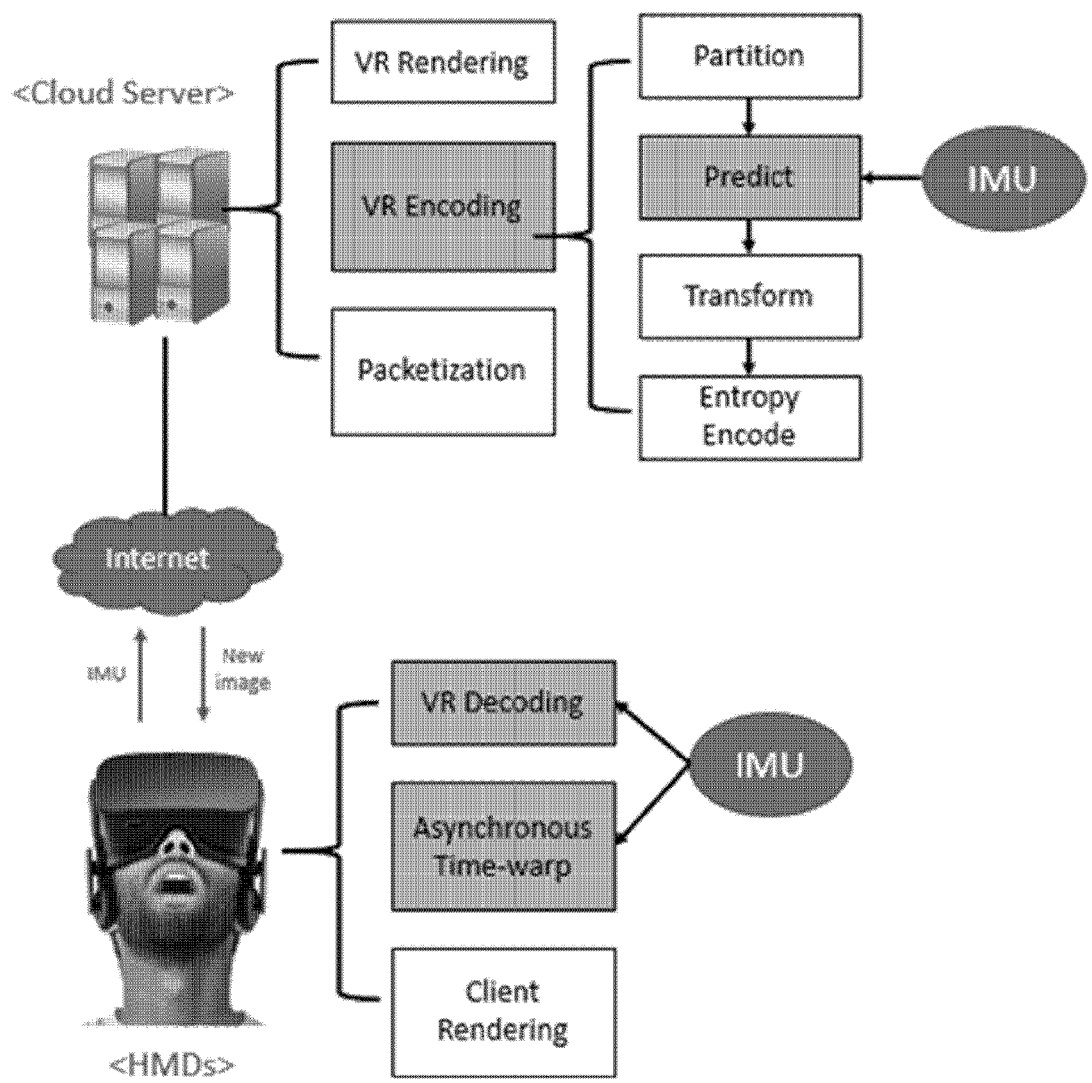

[Fig. 5]
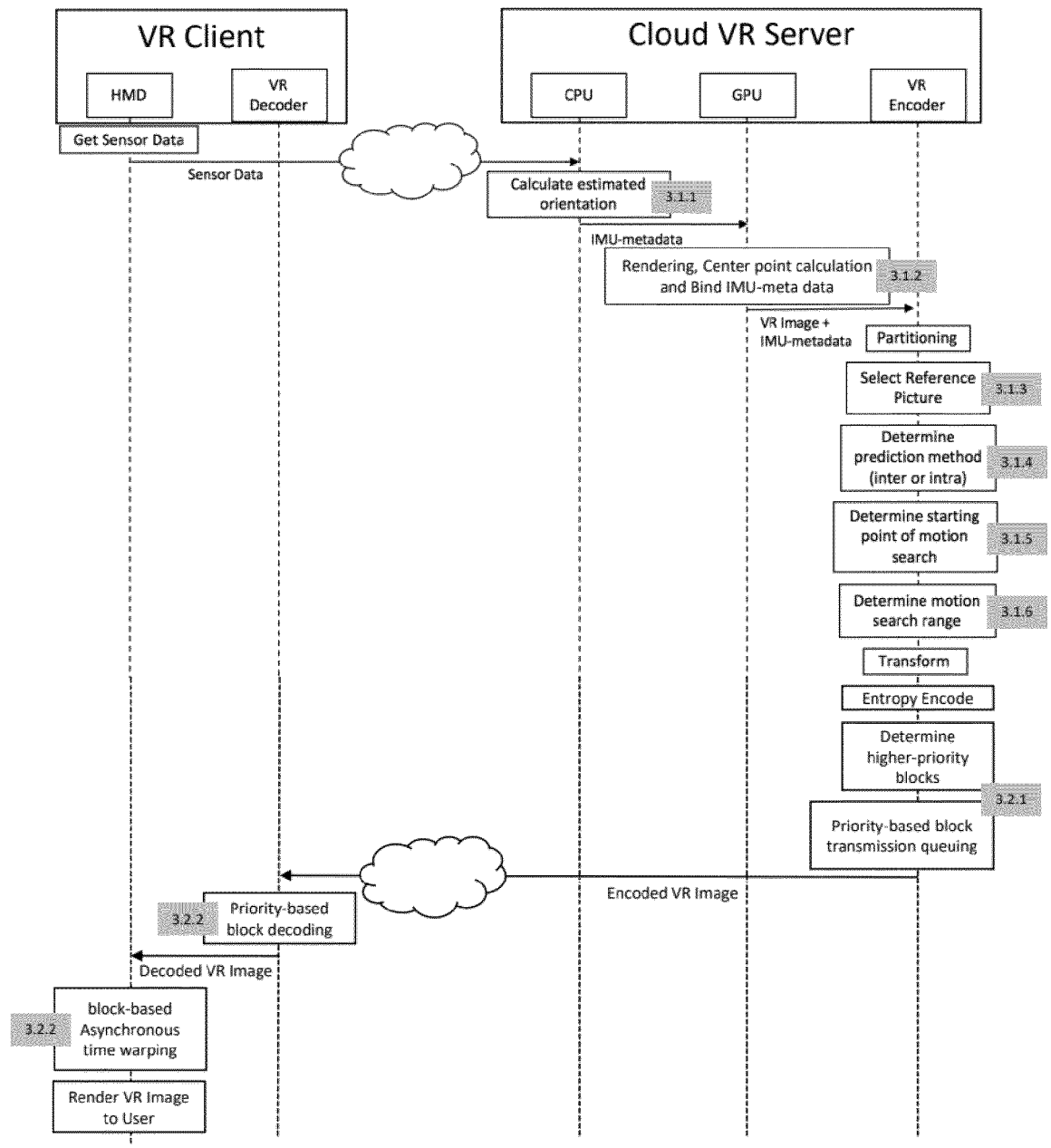

[Fig. 6]
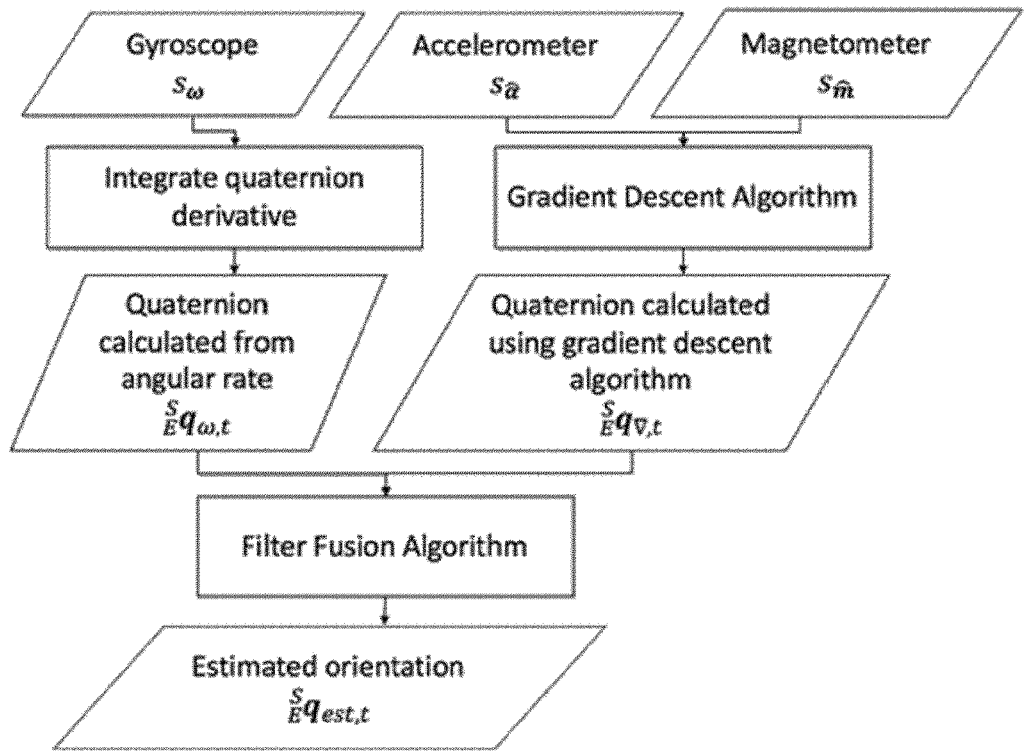
[Fig. 7]
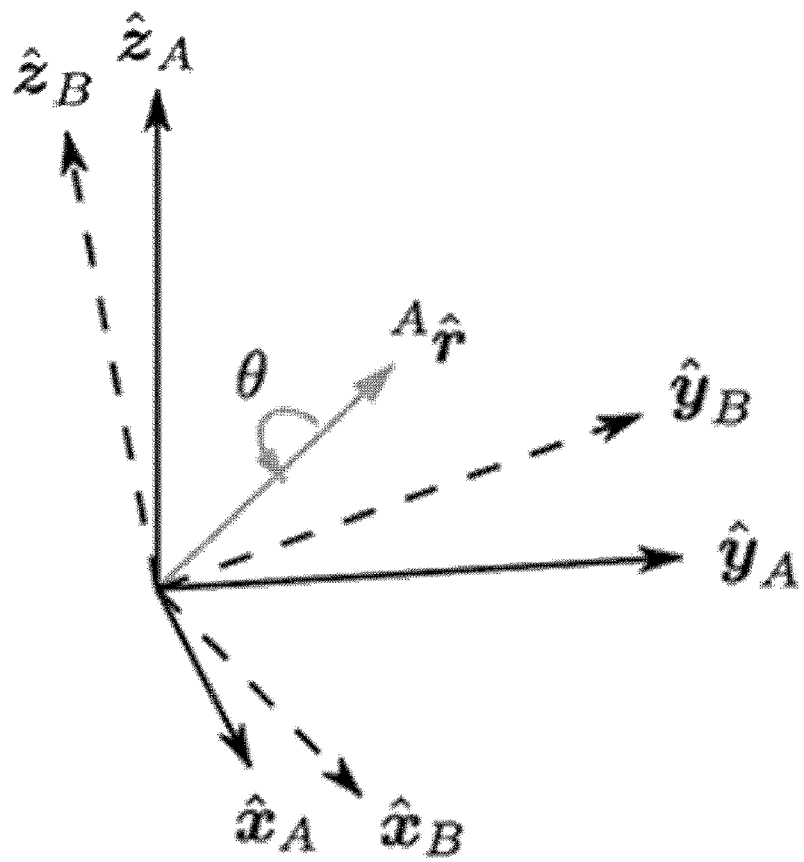

[Fig. 8]
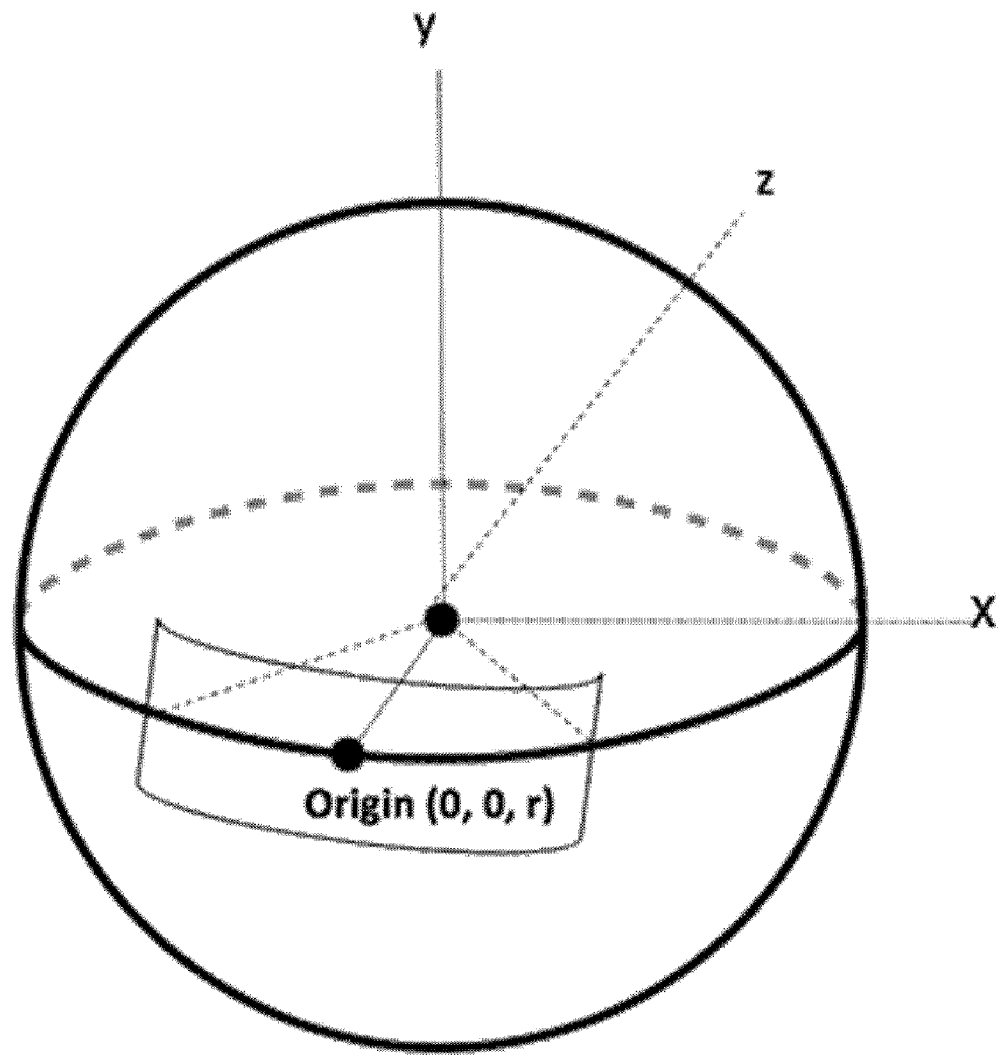

[Fig. 9]
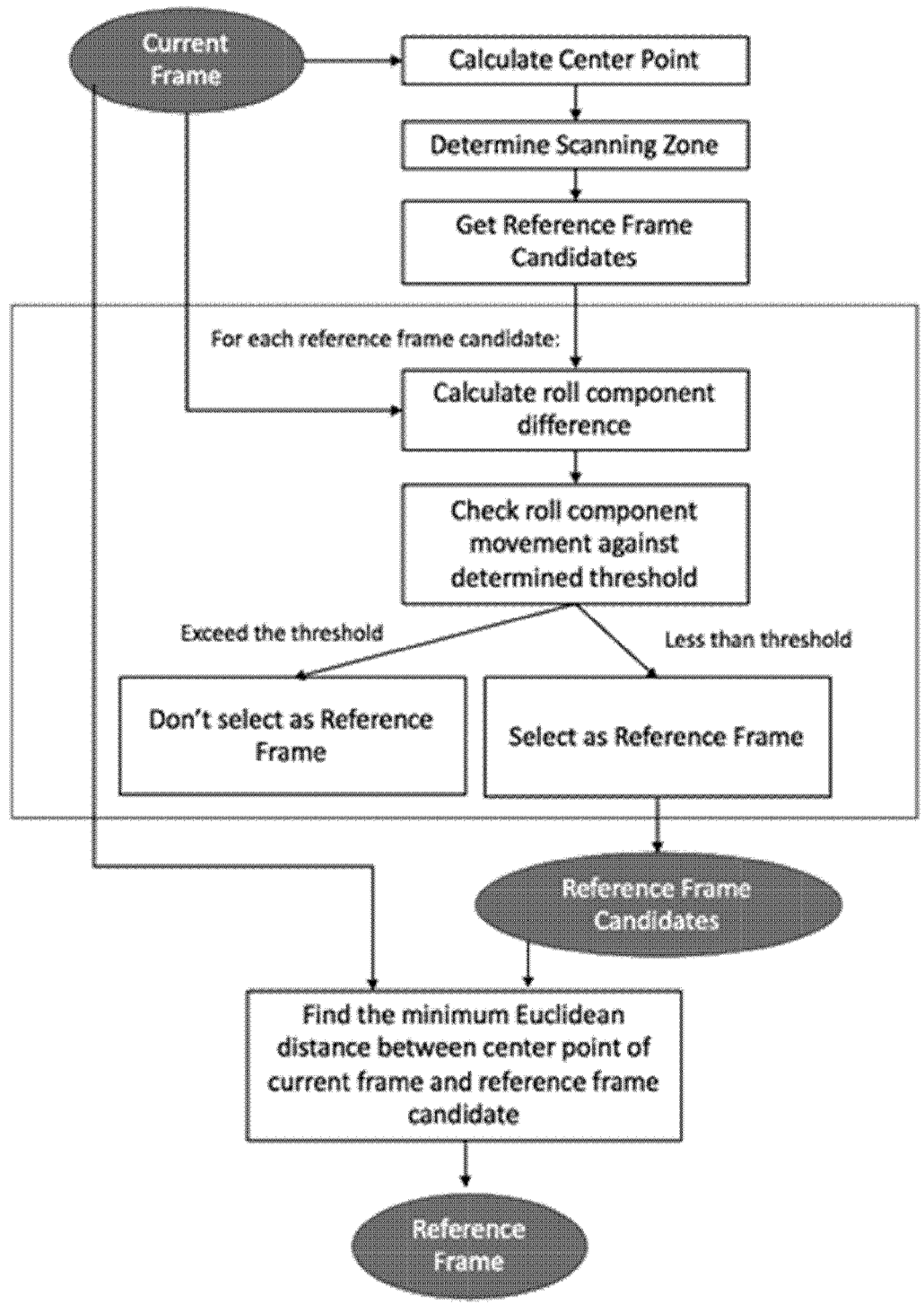

[Fig. 10]
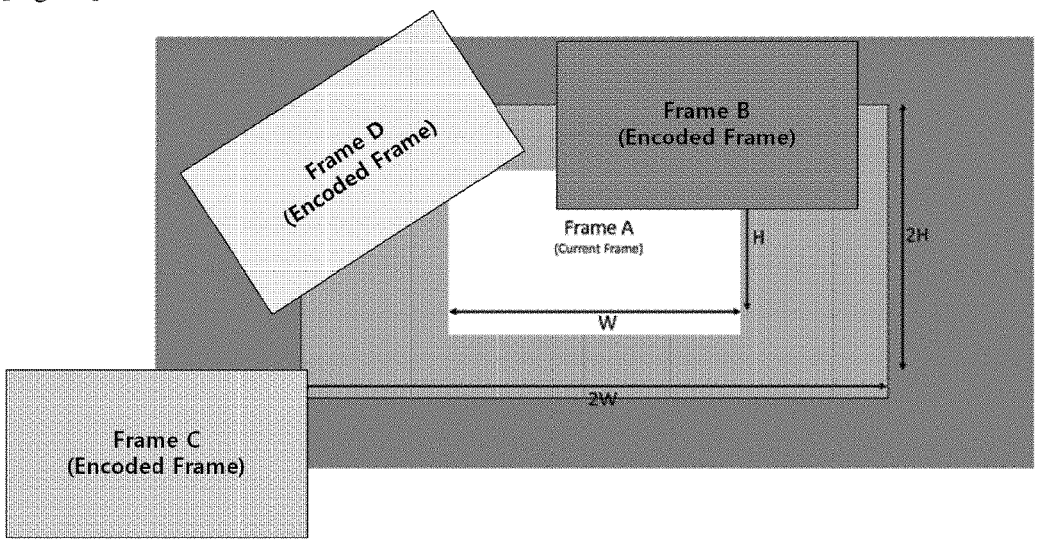
[Fig. 11]
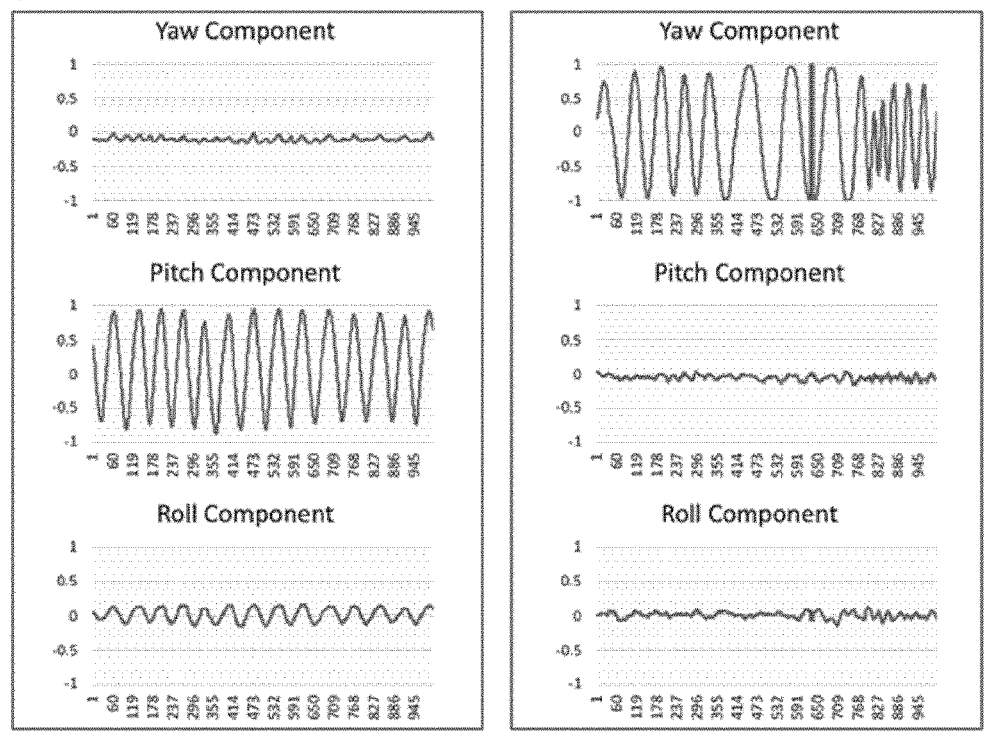
[Fig. 12]
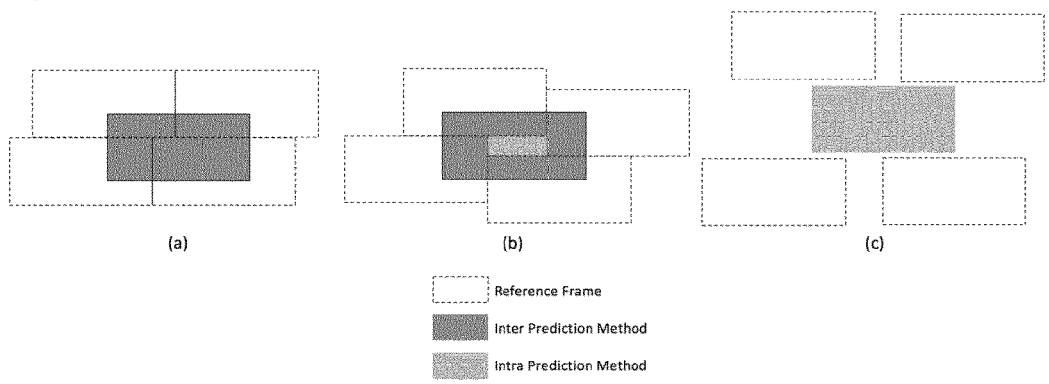

[Fig. 13]
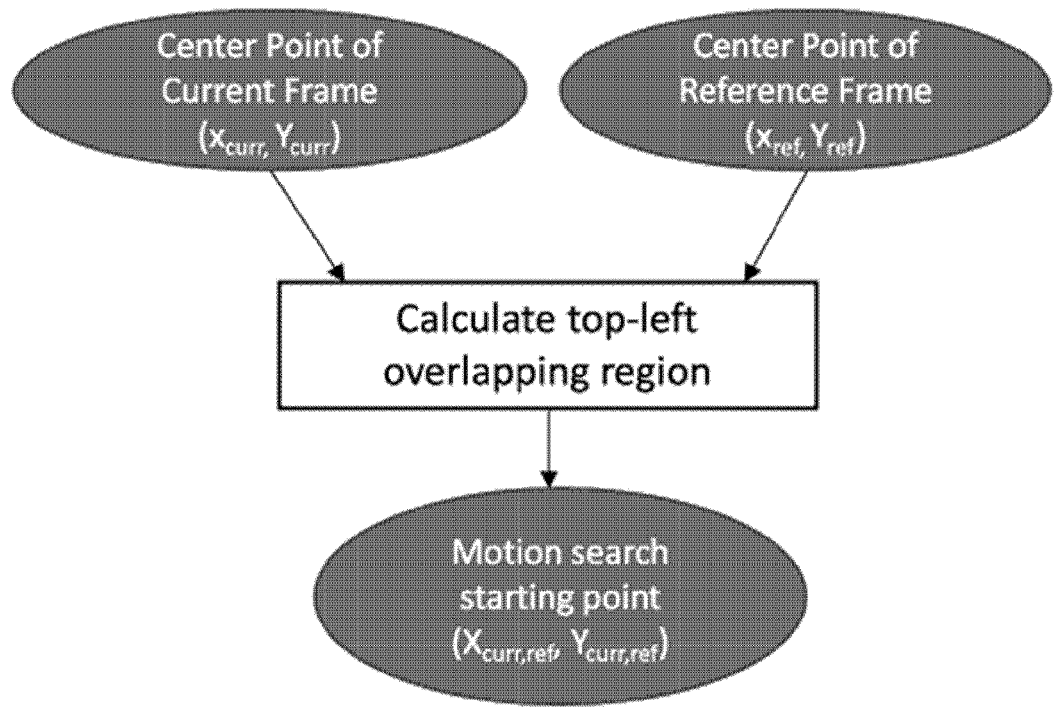
[Fig. 14]
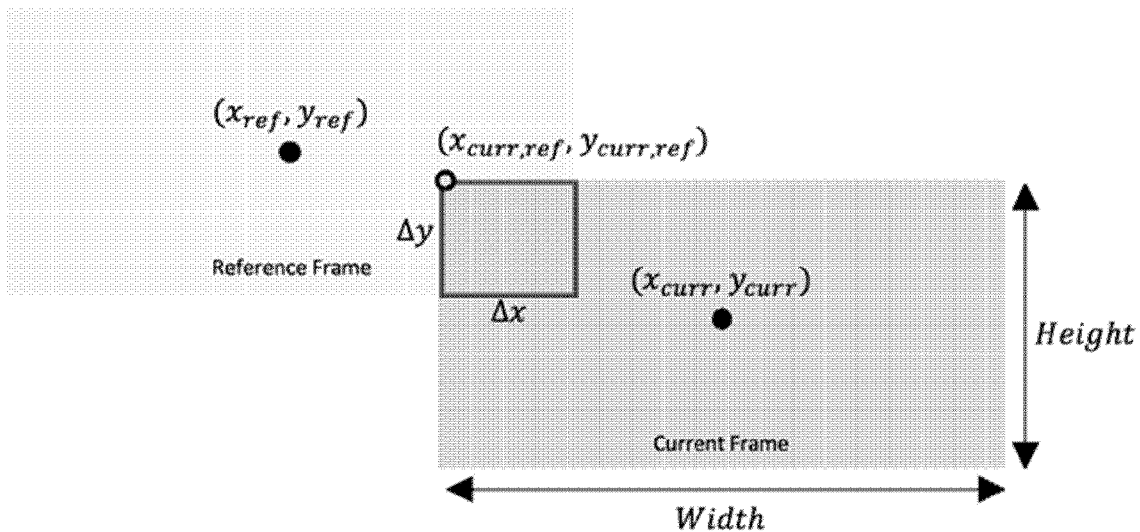

[Fig. 15]
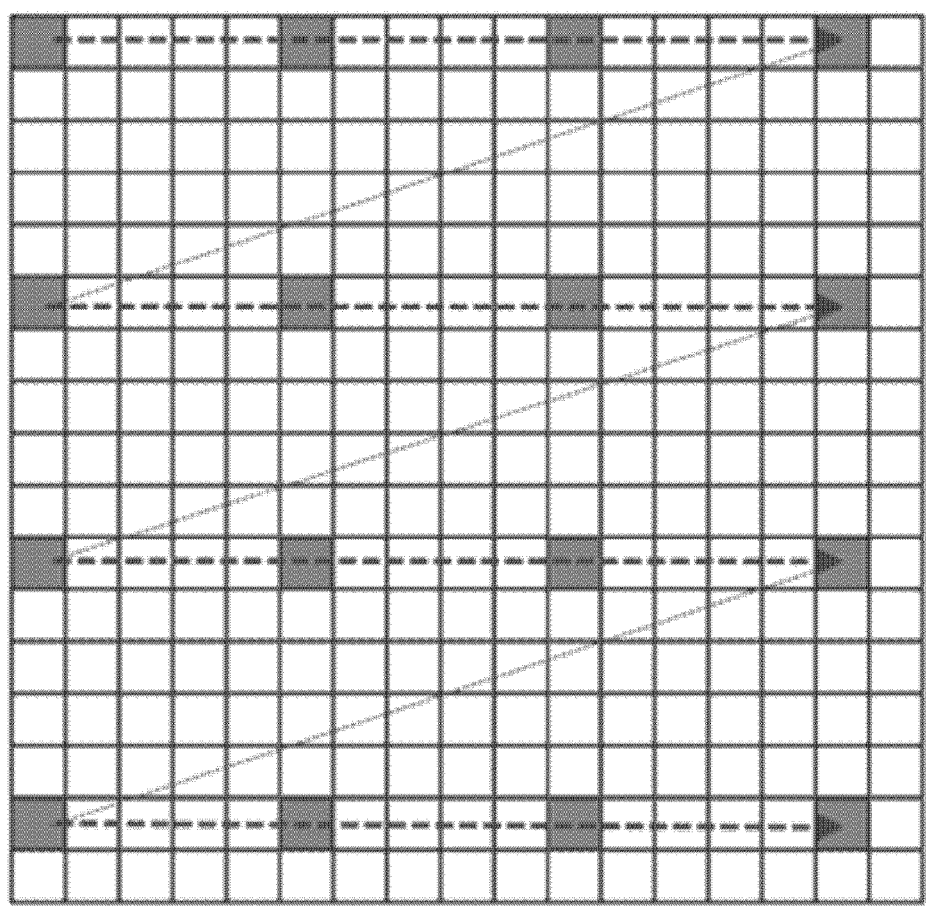

[Fig. 16]
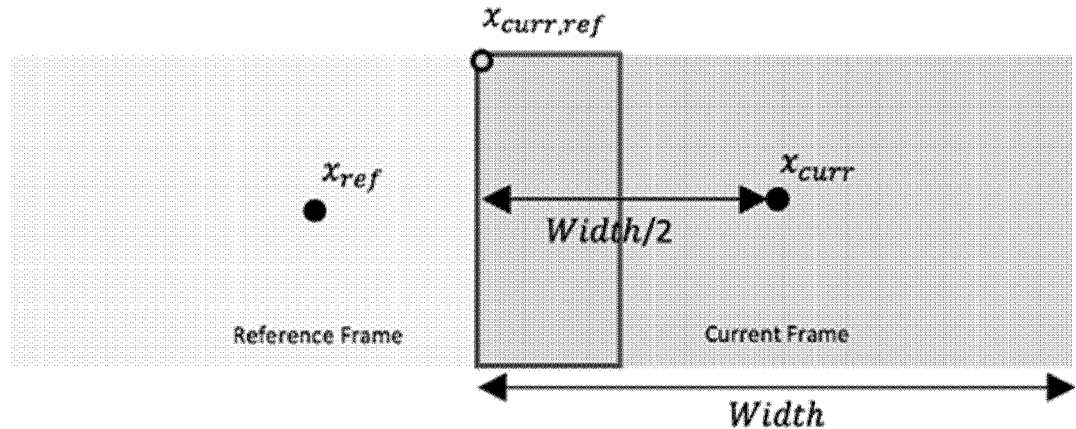
(a)
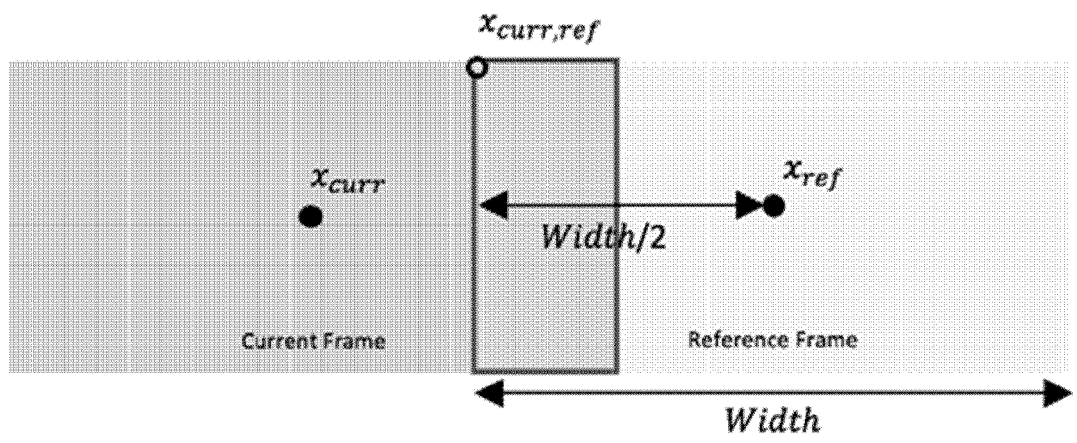
(b)
[Fig. 17]
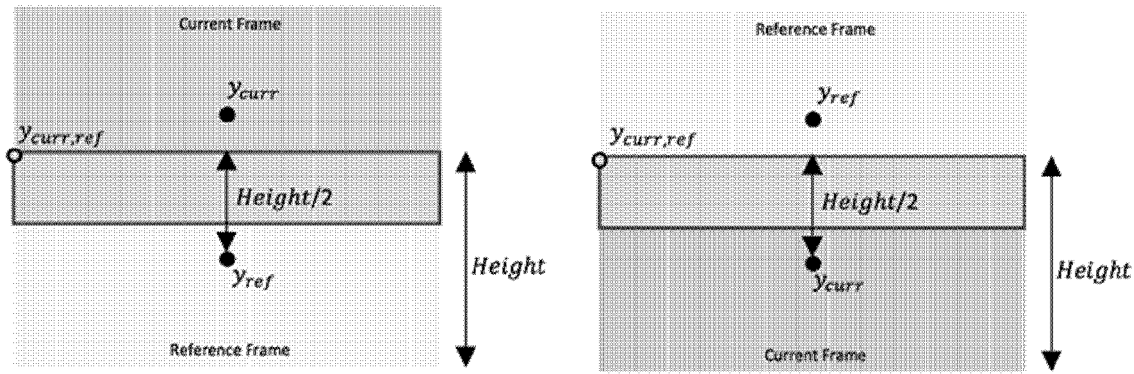

[Fig. 18]
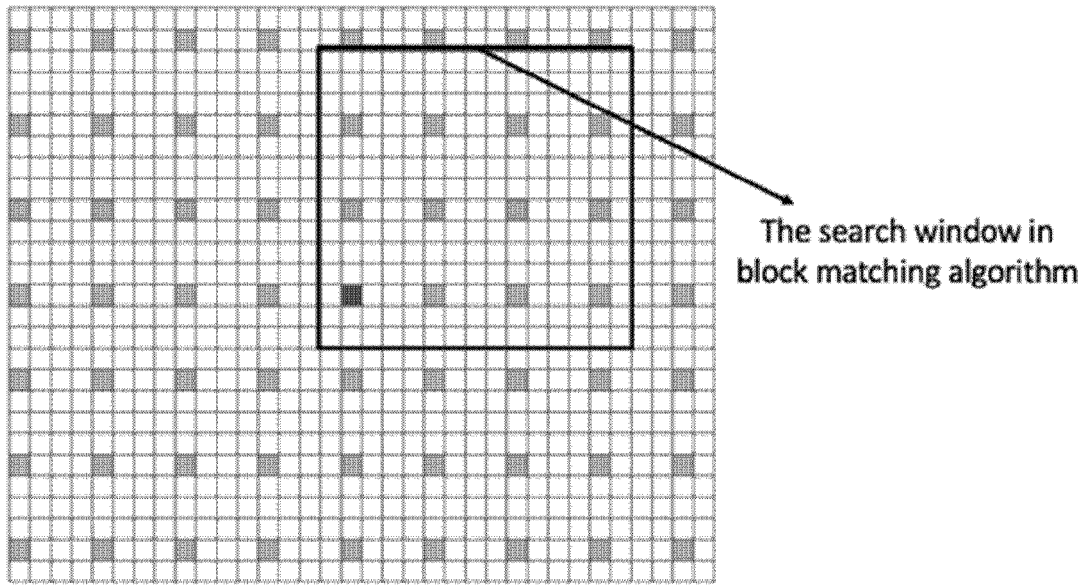
[Fig. 19]
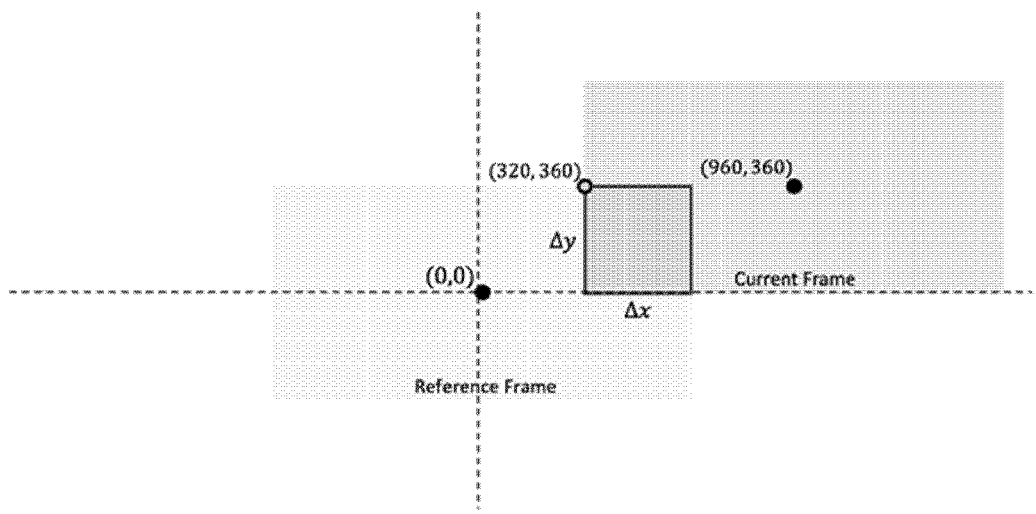

[Fig. 20]
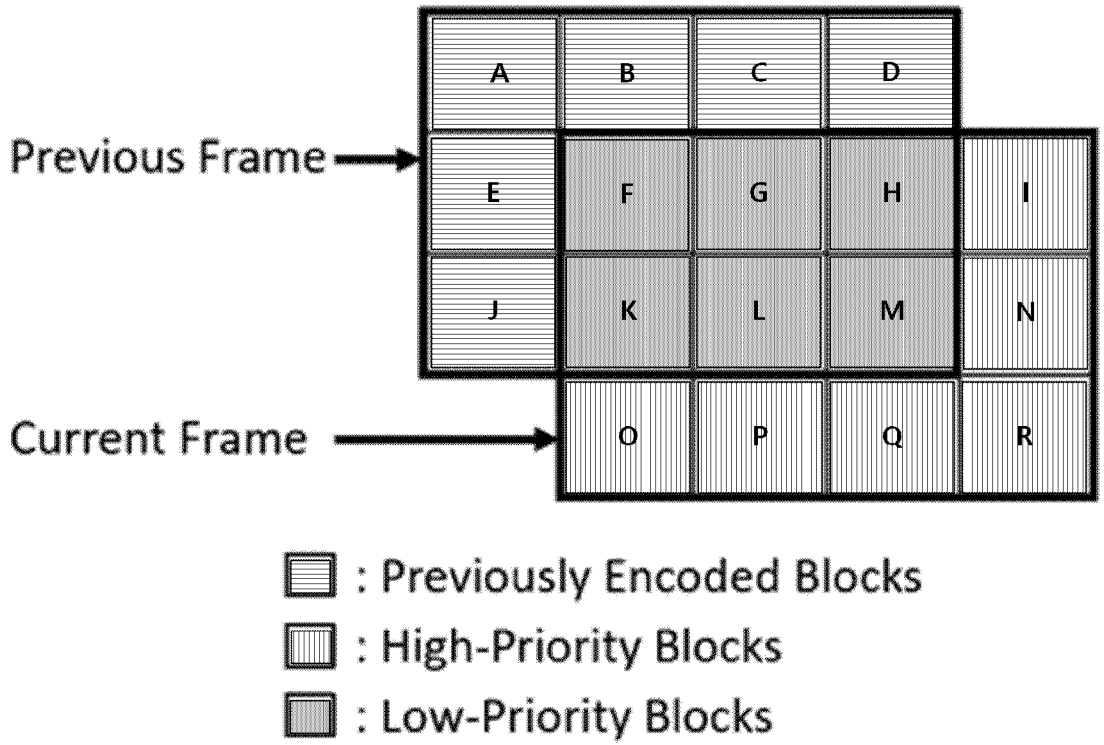
[Fig. 21]
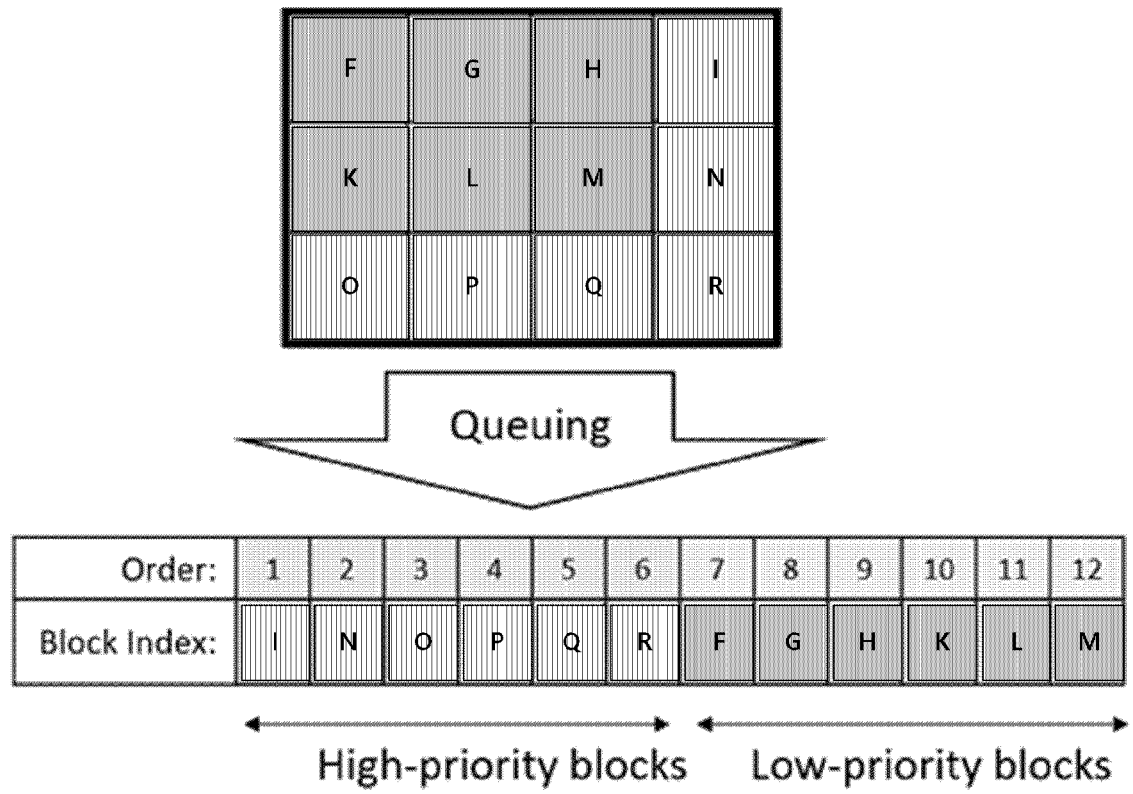

[Fig. 22]
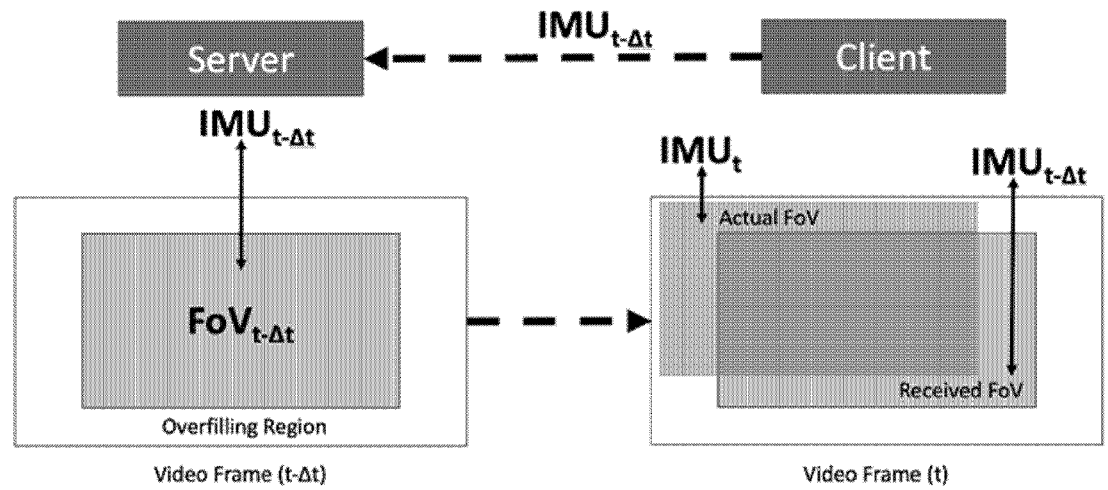
[Fig. 23]
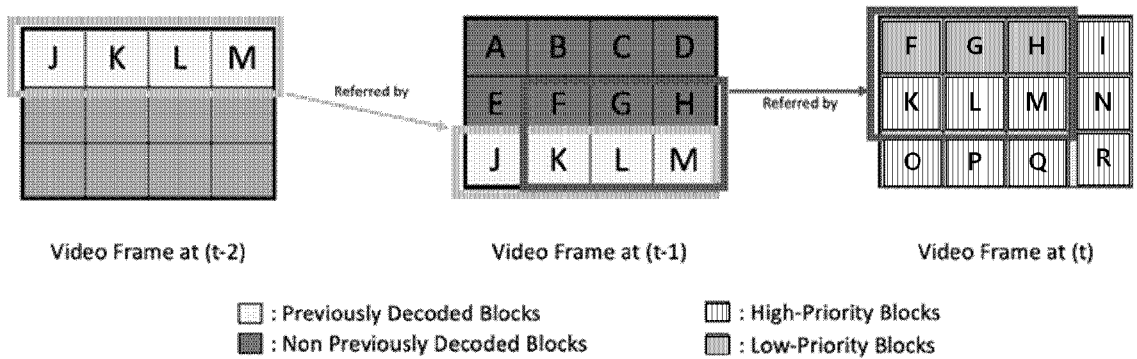
[Fig. 24]
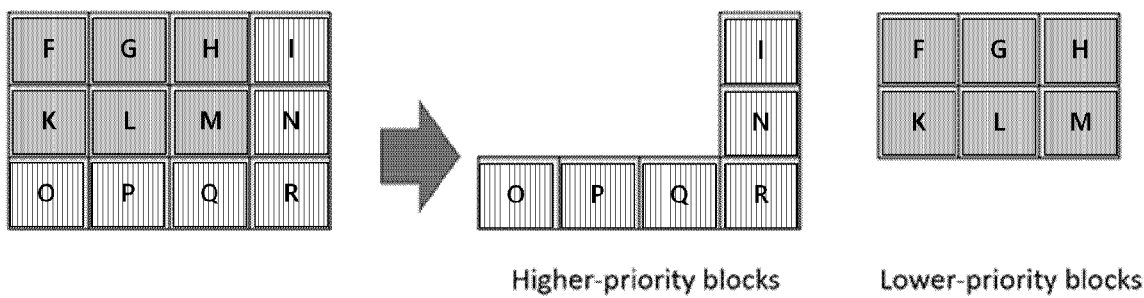

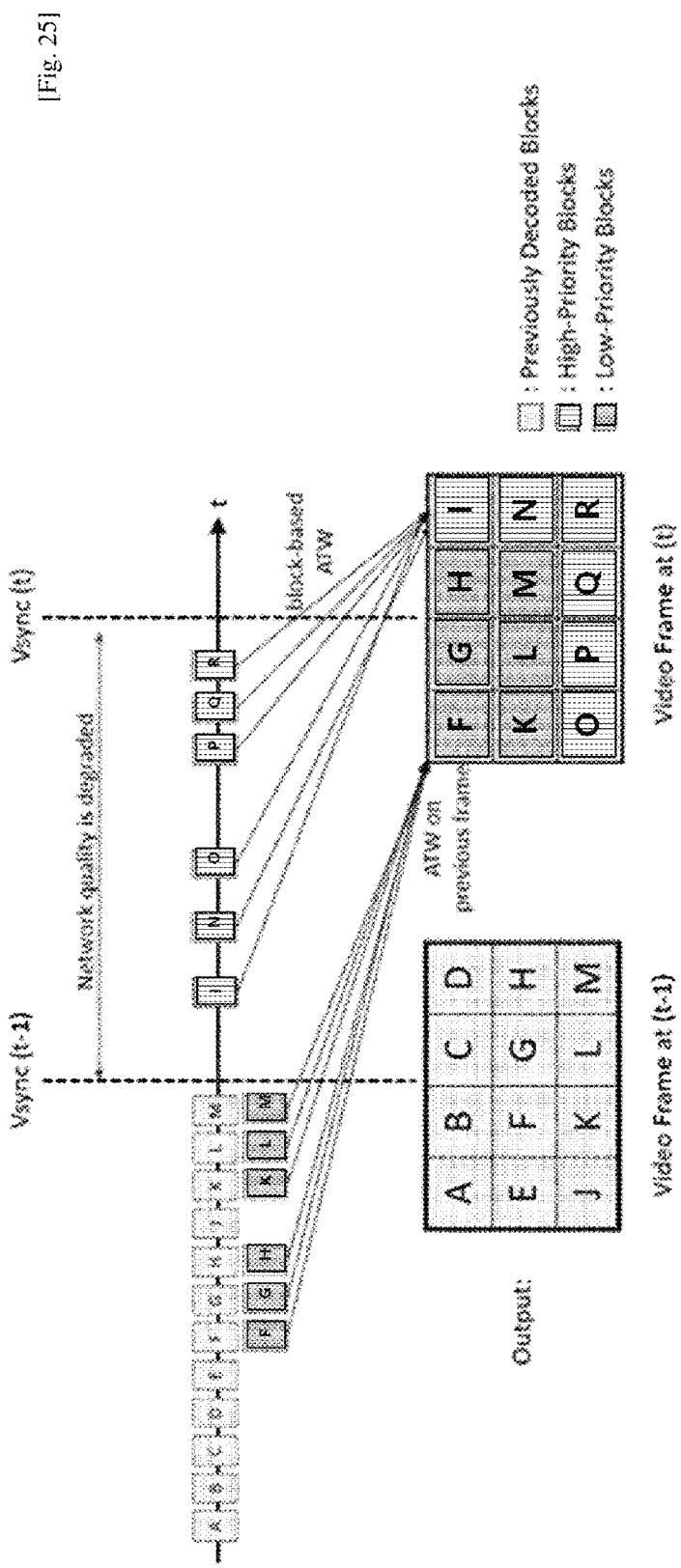
[Fig. 25]

VIDEO ENCODING AND DECODING ACCELERATION UTILIZING IMU SENSOR DATA FOR CLOUD VIRTUAL REALITY

CROSS-REFERENCE TO RELATED APPLICATIONS

The present application is a continuation of U.S. patent application Ser. No. 17/504,479 filed on Oct. 18, 2021, which is a continuation of International Patent Application No. PCT/KR2020/011875 filed on Sep. 3, 2020, which claims the priority to Korean Patent Application No. 10-2019-0109782 filed in the Korean Intellectual Property Office on Sep. 4, 2019, the entire contents of which are incorporated herein by reference.

TECHNICAL FIELD

In cloud VR (Virtual Reality) system, the VR content requires high resolution video and it should be encoded before being transmitted over network in the cloud VR. The encoding process is one of the processes that takes a lot of computational burden and processing time in Cloud VR. Therefore, Cloud VR still requires fast video encoding to minimize the total latency of Cloud VR System.

BACKGROUND ART

In recent years, there are a lot of big tech companies make their own big steps in VR (Virtual Reality). However, these all big steps so far, there is still one major issue regarding its accessibility to mass user due to its high pricing. Undeniably, one of the main obstacles to popularize VR amongst mass users is the total cost of ownership.

Due to virtual reality's high price today, one of possibilities can occur is offering it alongside a nascent technology called cloud gaming. Cloud gaming is the concept of rendering game content in the server side, then video streaming the rendered output directly to the user's display.

Video encoding is the process of changing the format of digital video from one standard into another generally for the purpose of efficiency and compatibility with a desired set of applications and hardware. Due to limited bandwidth, video compression is important in Cloud VR. VR content must be compressed as efficiently as possible before it is transmitted to the client. However, video compression requires processing time. The higher the level of compression, the more time it takes. One of the processes that affects the compression ratio is the motion estimation.

The motion estimation (ME) finds the displacement of the best matched block in reference frames as motion vector (MV) for blocks in current frame. By only calculating and encoding the motion vector difference (difference between MV and its prediction) and prediction residual (difference between the contents of the current block and the reference block), a lot of bits can be saved, thus the compression rate becomes high.

Hardware-accelerated video encoder is a certain hardware chipset that provides fully accelerated hardware-based video encoding. With encoding offloaded, the CPU is free for other operations. GPU hardware accelerator engines for video encoding supports faster than real-time video processing which makes them suitable to be used for Cloud VR streaming applications. One of existing hardware-accelerated video encoder from Nvidia is NVIDIA Video Codec SDK (formerly NVENC).

DISCLOSURE OF INVENTION

Technical Problem

The present invention provides an efficient encoding/decoding method using IMU (Inertial Measurement Unit) data.

Solution to Problem

The present invention provides the following encoding acceleration method and encoding acceleration device.

First, according to an embodiment of the present invention, An encoding acceleration method of cloud VR (virtual reality) video, the method comprising: constructing a reference frame candidate for encoding of a current frame; selecting a specific reference frame among the reference frame candidate based on a sensor data of IMU (Inertial Measurement Unit); selecting a prediction mode for encoding the current frame based on information included in the specific reference frame; and encoding the current frame based on the selected prediction mode.

The IMU is included accelerometers, gyroscopes, and magnetometers.

A rotation orientation of the reference frame candidate and a rotation orientation of the current frame are same.

The specific reference frame is a frame having a minimum Euclidean distance from the current frame among the reference frame candidate.

A difference between a roll of the specific reference frame and a roll of the current frame is less than a preset threshold.

The reference frame candidate is composed of one or more frames having a center point within the scanning zone, wherein the scanning zone corresponds to twice a height of the current frame and twice a width of the current frame.

The selecting a prediction mode for encoding the current frame based on information included in the specific reference frame comprising: selecting a specific reference block among blocks comprising the specific reference frame corresponding to a specific current block among blocks comprising the current frame; encoding the specific current block based on a motion vector of the specific reference block.

The specific reference block is one of blocks of an overlapping region between the current frame and the specific reference frame.

The specific reference block is a block having the smallest SAD (Sum of Absolute Difference) among SADs of blocks of the overlapping region, wherein the SADs are calculated from an upper-left block among blocks of the overlapping region.

An encoding acceleration device performing an encoding acceleration method of a cloud VR (Virtual Reality) video, the encoding acceleration device comprising: a processor, wherein the processor is configured to: construct a reference frame candidate for encoding of a current frame, select a specific reference frame among the reference frame candidate based on a sensor data of IMU (Inertial Measurement Unit), select a prediction mode for encoding the current frame based on information included in the specific reference frame, encode the current frame based on the selected prediction mode.

The IMU is included accelerometers, gyroscopes, and magnetometers.

A rotation orientation of the reference frame candidate and a rotation orientation of the current frame are same.

The specific reference frame is a frame having a minimum Euclidean distance from the current frame among the reference frame candidate.

A difference between a roll of the specific reference frame and a roll of the current frame is less than a preset threshold.

The reference frame candidate is composed of one or more frames having a center point within the scanning zone, wherein the scanning zone corresponds to twice a height of the current frame and twice a width of the current frame.

The processor selecting a prediction mode for encoding the current frame based on information included in the specific reference frame comprising: selecting a specific reference block among blocks comprising the specific reference frame corresponding to a specific current block among blocks comprising the current frame; encoding the specific current block based on a motion vector of the specific reference block.

The specific reference block is one of blocks of an overlapping region between the current frame and the specific reference frame.

The specific reference block is a block having the smallest SAD (Sum of Absolute Difference) among SADs of blocks of the overlapping region, wherein the SADs are calculated from an upper-left block among blocks of the overlapping region.

Advantageous Effects of Invention

The proposed solution accelerates video encoding for Cloud VR (Virtual Reality) Streaming.

The proposed solution has a more accurate video frame prediction resulting in higher video quality and compression rates.

The proposed solution increases the speed of the software-based encoder that make it feasible to be applied in the Cloud VR with high backward compatibility to existing HMD (Head Mounted Display).

The proposed solution can also be applied to hardware-accelerated encoder to enhance its performance.

The proposed solution can reduce the "blank spot" of the screen as the results of asynchronous time-warp.

The proposed solution can efficiently decode the received video frame at the client side.

BRIEF DESCRIPTION OF DRAWINGS

FIG. 1 shows Cloud VR System Architecture.
FIG. 2 shows Motion search process in video encoding.
FIG. 3 shows NVENC Performance Gain against x264.
FIG. 4 shows overall solution architecture.
FIG. 5 shows detailed procedure for the proposed solution.
FIG. 6 shows Madgwick IMU sensor fusion algorithm.
FIG. 7 shows the orientation of frame B is achieved by a rotation, from alignment with frame A, θ of angle q around the $A_f$ axis.
FIG. 8 shows origin point of the virtual world from (x, y, z axes).
FIG. 9 shows reference picture selection based on IMU data.
FIG. 10 shows scanning zone and roll orientation component validation.
FIG. 11 shows Pitch-only and yaw-only head movement IMU sensor tracking measurement.
FIG. 12 shows 3 Conditions of encoding prediction process: (a) fully inter-mode, (b) partially inter and intra-mode and (c) fully intra-mode.
FIG. 13 shows Motion search starting point determination process.
FIG. 14 shows Overlapping region between current processed frame and reference frames.
FIG. 15 shows Motion vector search direction in encoding process.
FIG. 16 shows x-component: (a) $x_{curr} \geq x_{ref}$ (b) $x_{curr} < x_{ref}$.
FIG. 17 shows x-component: (a) $y_{curr} \geq y_{ref}$ (b) $y_{curr} < y_{ref}$.
FIG. 18 shows search window size in motion search algorithm.
FIG. 19 shows example of determining search window size.
FIG. 20 shows High-priority blocks and Low-priority blocks.
FIG. 21 shows Priority-based blocks transmission queue.
FIG. 22 shows Actual FoV (Field of view) Calculation.
FIG. 23 shows Reference Blocks Reuse Limitation.
FIG. 24 shows Two categories of block in a video frame.
FIG. 25 shows Priority-based block decoding and asynchronous time-warping.

MODE FOR THE INVENTION

Application of cloud gaming to Virtual Reality (VR) system (Cloud VR) enables the users to experience and enjoy VR content without owning a high-end PC. Cloud VR which utilize hi-spec computer as a server to generate and stream VR content to thin clients is one of promising solution for widespread adoption of VR. FIG. 1 shows Cloud VR System Architecture.

However, there are some limitations and weaknesses of this cloud VR solution. Since it is client/server-based system, there must be some added latency for content processing and transferring. The latency in VR system (motion-to-photon latency) should be less than 20 ms to make a great VR experience and reduce user's nausea. Therefore, in the cloud VR, real-time computer graphic (CG) rendering and the encoding (compression) of rendered image should be processed within the extremely short period to minimize the overall motion-to-photon latency.

Video Encoding and Compression

Typical motion estimation (ME) comprises three main steps, including motion vector predictors (MVPs) determination, integer-pel motion search and fractional-pel (half and quarter) motion search. The integer-pel motion search is the most critical and time-consuming part of video encoding. It traverses all blocks within search range and seeks the best matched integer-pel position. It occupies over 50% of the overall encoding time. The integer-pel search is strongly influenced by search window placement (search starting point) and search window size. FIG. 2 shows Motion search process in video encoding.

Technically, search window placement is affected by how accurate MVPs are. MVPs are used as one of the determinations of the search starting point of the motion estimation process. In addition, search window size also greatly affects the performance of video encoders. The encoding process with larger window size. The encoding process with a large search window will result in a high compression ratio but requires a long process time and a large CPU workload, and vice versa. Therefore, the determination of search window size and starting point plays an important role in the encoder's performance in the motion estimation process.

Typical motion estimation (ME) comprises three main steps, including motion vector predictors (MVPs) determination, integer-pel motion search and fractional-pel (half and quarter) motion search. The integer-pel motion search is the most critical and time-consuming part of video encoding. It traverses all blocks within search range and seeks the best matched integer-pel position. It occupies over 50% of the overall encoding time. The integer-pel search is strongly influenced by search window placement (search starting point) and search window size. FIG. 2 shows Motion search process in video encoding.

Technically, search window placement is affected by how accurate MVPs are. MVPs are used as one of the determinations of the search starting point of the motion estimation process. In addition, search window size also greatly affects the performance of video encoders. The encoding process with larger window size. The encoding process with a large search window will result in a high compression ratio but requires a long process time and a large CPU workload, and vice versa. Therefore, the determination of search window size and starting point plays an important role in the encoder's performance in the motion estimation process.

Typical motion estimation (ME) comprises three main steps, including motion vector predictors (MVPs) determination, integer-pel motion search and fractional-pel (half and quarter) motion search. The integer-pel motion search is the most critical and time-consuming part of video encoding. It traverses all blocks within search range and seeks the best matched integer-pel position. It occupies over 50% of the overall encoding time. The integer-pel search is strongly influenced by search window placement (search starting point) and search window size. FIG. 2 shows Motion search process in video encoding.

Technically, search window placement is affected by how accurate MVPs are. MVPs are used as one of the determinations of the search starting point of the motion estimation process. In addition, search window size also greatly affects the performance of video encoders. The encoding process with larger window size. The encoding process with a large search window will result in a high compression ratio but requires a long process time and a large CPU workload, and vice versa. Therefore, the determination of search window size and starting point plays an important role in the encoder's performance in the motion estimation process.

Typical motion estimation (ME) comprises three main steps, including motion vector predictors (MVPs) determination, integer-pel motion search and fractional-pel (half and quarter) motion search. The integer-pel motion search is the most critical and time-consuming part of video encoding. It traverses all blocks within search range and seeks the best matched integer-pel position. It occupies over 50% of the overall encoding time. The integer-pel search is strongly influenced by search window placement (search starting point) and search window size. FIG. 2 shows Motion search process in video encoding.

Technically, search window placement is affected by how accurate MVPs are. MVPs are used as one of the determinations of the search starting point of the motion estimation process. In addition, search window size also greatly affects the performance of video encoders. The encoding process with larger window size. The encoding process with a large search window will result in a high compression ratio but requires a long process time and a large CPU workload, and vice versa. Therefore, the determination of search window size and starting point plays an important role in the encoder's performance in the motion estimation process.

Hardware-Accelerated Video Encoder

The following is the performance gain of NVENC on top of the software-based encoder x264. FIG. 3 shows that NVENC produces better performance compared to x264. Graph shows NVENC performance tends to be better for fast preset than slow preset. However, the performance of NVENC dropped dramatically as the video resolution increased. For 720p resolution, NVENC produces more than 800 FPS but at a larger resolution (1080p), performance decreases more than doubled to around 350 fps.

On the other hand, virtual reality requires a very large resolution (4K) and high FPS that is at least 90 FPS. If projected based on trends from the graph, then NVENC performance will decrease to around 60-70 FPS for the resolution needed by VR. Hence, this proves that hardware-accelerated video encoder still cannot accommodate the minimum requirements of high user experience of VR.

In cloud VR system, the VR content requires high resolution video and it should be encoded before being transmitted over network in the cloud VR. The encoding process is one of the processes that takes a lot of computational burden and processing time in Cloud VR. The speed and performance of the video encoder is very important to reduce the total latency of the Cloud VR system. There are now many video encoder solutions with a large compression ratio. However, these solutions are still not able to process VR content that has a very high resolution with extremely short time. Therefore, Cloud VR still requires fast video encoding to minimize the total latency of Cloud VR System.

One solution to improve the performance of the video encoder is utilizing the VR specific information to the encoding process. In VR, IMUs plays an important role to perform the rotational tracking and measure the rotational movements of the pitch, yaw and roll. The results of this rotational movement measurement will be used to transform 3D objects in a virtual world. This rotational movement makes changes or movements in virtual worlds when the users move the HMD (Head Mounted Display)s.

However, currently IMU is only used to transform 3D objects in virtual worlds. Even if further investigated, there must be a correlation between the rotational movement produced by IMU and the VR scene formed. As explained, the VR scene that is formed must be encoded and compressed before being transmitted to the client. Therefore, by utilizing the correlation between the VR scene and the IMU that forms it, IMU can be used as additional information to improve the performance of video encoding in the Cloud VR System.

As explained above, there might be some ways to improve the performance in the VR encoding process. The IMU data which is mostly used for orientation tracking only also can be utilized to improve the performance of the encoding process. It reduces the computational cost by pruning some unnecessary processes. On the client side, we are also thinking to utilize the IMU data to improve the performance of the decoding process. Even though the decoding process is not as formidable as the encoding process, the small improvement still has a notable impact on the whole Cloud VR system.

We propose a solution that can optimize the performance of the video encoder and decoder in Cloud VR by utilizing IMU data from the VR HMD. FIG. 4 shows the overall solution architecture.

The VR HMD at the client side transmits sensor reading from IMU and eye tracking data to the server. At the server side, VR Renderer generates VR image based on the IMU data in the virtual world. After that, the rendered VR image are encoded and compressed by video encoder before being transmitted to the client side. As we discussed, it is extremely important to increase the performance and the speed of encoding process to reduce the total latency of Cloud VR system. In this solution report, we propose to utilize the IMU data as additional information to enhance the speed of video encoding in Cloud VR by reducing the overhead of motion search in inter-prediction process.

The utilization of IMU data for video encoding process consists of 4 improvement parts:
1. determining inter-frame reference picture selection,
2. determining prediction method (intra-prediction or inter-prediction),
3. determining motion search starting point,
4. determining motion search window size.

On the client side, it receives and decodes the block of video frame based on the priority order. The priority of each block is determined on the server side before it being transmitted. The block's priority is determined whether the block has ever been encoded on the previous video frame or not. The blocks which have never been encoded on the previous video frame will receive higher priority than the others that have ever been encoded previously.

The utilization of IMU data on the client side comprises of 2 improvement parts:
1. priority-based block transmission and decoding process,
2. enhancing the asynchronous time-warp process.

In this section we describe detailed procedure for the invention. FIG. 5 shows detailed procedure for the proposed solution.

Encoding Enhancement

Orientation Estimation and Sensor Fusion

Inertial Measurement Unit (IMU) is an electronic sensor composed of accelerometers, gyroscopes, and magnetometers. It measures a device's angular velocity, accelerometer and gravitational forces. In VR, IMUs are used to perform rotational tracking for HMDs. It measures the rotational movements and the orientation of the pitch, yaw and roll. This information will then be used as a basis for transforming 3D objects in virtual worlds.

It is necessary to preprocess IMU sensor data to orientation value before using it in virtual reality. A gyroscope measures angular velocity which, if initial conditions are known, may be integrated over time to compute the sensor's orientation. The integration of gyroscope measurement errors will lead to an accumulating error in the calculated orientation. Therefore, gyroscope alone cannot provide an absolute measurement of orientation.

An accelerometer and magnetometer will measure the earth's gravitational and magnetic fields respectively and so provide an absolute reference of the orientation. However, they are likely to be subject to high levels of noise; for example, accelerations due to motion will corrupt measured direction of gravity. The task of an orientation filter is to compute a single estimate of orientation through the optimal fusion of gyroscope, accelerometer, and magnetometer measurement.

The Kalman filter has become the accepted basis for majority of orientation filter algorithms, however the Kalman-based solutions have a number of disadvantages regarding to the computational load and complexity. Sebastian Madgwick developed an efficient orientation filter algorithm which is addressing issues of computational load and complexity associated with Kalman-based approaches. The whole algorithm process can be seen in FIG. 6. In general, the algorithm has three main processes. The first process calculates the orientation using quaternion derivative integration which utilizes the angular rate of the measurement results of gyroscope $S_\omega$. The second process estimates the orientation using the gradient descent algorithm by combining measurement results from the accelerometer $S_{\hat{\alpha}}$ and magnetometer $S_{\hat{m}}$ as the input. The first and the second processes will result two orientation estimations of the sensor frame relative to earth frame $_E^S q_{\omega,t}$ and $_E^S q_{\nabla,t}$ respectively. Finally, filter fusion algorithm is used to calculate optimal estimated orientation $_E^S q_{est,t}$ through the fusion of the estimated orientation results from two previous processes.

Madgwick algorithm employs a quaternion representation of orientation to describe the coupled nature of orientations in three-dimensions. A quaternion is a four-dimensional complex number that can be used to represent the orientation of a ridged body or coordinate frame in three-dimensional space. A particular orientation of frame B relative to frame A can be achieved through a rotation of angle θ around an axis $^A\hat{r}$ defined in frame A (FIG. 7). The quaternion describing this orientation, $_B^A\hat{q}$ is defined by equation 1.

$$_B^A\hat{q} = [q_1 q_2 q_3 q_4] = \cos\theta/2 - r_x \sin\theta/2 - r_y \sin\theta/2 - r_z \sin\theta/2 \quad [\text{Math.1}]$$

Euler angles φ, θ, and ψ describe an orientation of frame B achieved by the sequential rotations, from alignment with frame A, of ψ around $\hat{z}_B$, θ around $\hat{y}_B$ and φ around $\hat{x}_B$.

This Euler angle representation of $_B^A\hat{q}$ is defined by equations 2, 3 and 4.

$$\psi = \text{Atan } 2(2q_2q_3 - 2q_1q_4, 2q_1^2 + 2q_2^2 - 1) \quad [\text{Math.2}]$$

$$\theta = -\sin^{-1}(2q_2q_4 + 2q_1q_3) \quad [\text{Math.3}]$$

$$\phi = \text{Atan } 2(2q_3q_4 - 2q_1q_2, 2q_1q_2, 2q_1^2 + 2q_4^2 - 1) \quad [\text{Math.4}]$$

Center Point of Frame Calculation

IMU data is used as the identifier of each VR image, more specifically, the coordinate position of the center point of VR image is used as the identifier of each VR image. First, we define the origin point of virtual world which is (0, 0, r) where r is the virtual distance between user and the virtual world. This origin point can be illustrated as in FIG. 8.

The next step is calculating the center point of the VR image. This can be done by rotating the origin position with the rotation matrix derived from orientation of particular VR image expressed by equation 5. The rotational matrix $_0^t R$ can be derived from orientation information $_0^t \hat{q}$ as expressed by equation 6.

$_0^t R$ is the rotational matrix applied to origin point to get 3D coordinate position at time t while $_0^t \hat{q}$ is the orientation information at time t relative to origin point.

$$\begin{bmatrix} x_{t,0} \\ y_{t,0} \\ z_{t,0} \end{bmatrix} = {_0^t R} \begin{bmatrix} x_0 \\ y_0 \\ z_0 \end{bmatrix} \quad [\text{Math.5}]$$

Given that $$_0^t \hat{q} = [q_1 \quad q_2 \quad q_3 \quad q_4], \quad [\text{Math.6}]$$

-continued $$_0^t R = \begin{bmatrix} 2q_1^2-1+2q_2^2 & 2(q_2q_3+q_1q_4) & 2(q_2q_4-q_1q_3) \\ 2(q_2q_3-q_1q_4) & 2q_1^2-1+2q_3^2 & 2(q_3q_4+q_1q_2) \\ 2(q_2q_4+q_1q_3) & 2(q_3q_4-q_1q_2) & 2q_1^2-1+2q_4^2 \end{bmatrix}$$

Reference Picture Selection

In a video encoding process, some pictures may be used as reference pictures when encoding of other pictures. This reference pictures are very important to remove the redundancy between video signals for high coding efficiency. VR image is rendered based on the IMU data from HMD. There must be strong correlation between rendered VR image and its IMU data. By utilizing this, in this proposed solution, we want to improve the accuracy and speed of video encoding.

One of the main process of video encoding is reference picture selection. It is the process when current processed video frame is selecting the most suitable encoded video frame to be used as its reference. First, rendered VR image is represented by unique identifier based on the IMU data used to generate it. As described above, we choose center point of the VR image as its identifier. After that, based on the VR image center point, it searches for the n-nearest center point of the surrounding encoded images within the determined scanning zone to make the search process more efficient. Before determining the candidate of reference frame, we must validate the roll orientation component on each reference frame. After roll orientation component validation, this will leave only the reference frame candidate with the same rotation orientation as the current processed frame. Finally, we determine the best reference frame based on IMU data by finding the minimum of Euclidean distance between the current processed frame and reference frame candidates. The whole process of the reference picture selection based on IMU data can be seen in FIG. 9.

In the beginning, we may already have a number of encoded video frames. Each video frames already associated with its center point in the virtual world coordinate system. To minimize the processing overhead, we first check whether the center point of the surrounding encoded frame is within the scanning zone or not. The scanning zone is determined by 2 times the width and height of the video frame. As seen in FIG. 10, Frame A is the current processed frame, while Frame B, Frame C, and Frame D are encoded frames that can be used as reference frame.

The scanning process for reference picture selection processes only the surrounding encoded frame with center point within the scanning zone. The further process is not needed for the frame whose center point is out of the scanning zone because there will be no intersection/overlapping area between that frame and the current frame. For example, in FIG. 10, Frame B is a good reference frame for Frame A because it is within the scanning zone, while Frame D and Frame C are not.

Furthermore, Frame D is also not good reference picture for A because the rotation orientation of Frame D is different with frame A. The current encoding technology still only supports translation of video frame in 2D space (x-y axes). However, the roll head movement type will cause a rotation of the video frame. Thus, the validation of roll orientation component is necessary in reference picture selection process.

In theory, the head movement type can be distinguished based on the value of each orientation component itself. For example, a pitch-only movement will only have a magnitude on the pitch ( $\Delta\phi$ ) component and 0 in the other component. To prove this, we conducted orientation tracking measurement for pitch-only and yaw-only movement to check whether there was a roll component effect on these movements.

Based on the measurement results FIG. 11, it shows that there's small rotation around z-axis (roll component) during both pitch-only and yaw-only movements. During yaw-only movement, there is roll component on an average of 1.9 degrees and the maximum rotation occurs is 14 degrees. In addition, during pitch-only movement, there is also rotation around the z-axis on an average of 4.18 degrees and the maximum rotation occurs as much as 20 degrees. The results of this measurement show that in one direction the head movement type such as pitch-only movement, there is still a slight rotation on the other axis. Therefore, we determine a threshold value for roll component ( $\Delta\psi_{thresh}$ ) which is 20 degrees.

This threshold value will be used as a determinant of whether a reference frame should be used as a reference for the current processed frame. First, the calculation of the difference in the roll component between the current processed frame and the reference frame needs to be calculated. After that, this value is compared to the specified threshold value. if the value is still below the threshold value, then the frame can still be used as a candidate for the reference frame. However, the reference frame will be excluded from the list of reference frame candidates if the difference in component roll exceeds the threshold value.

Finally, for every encoded frame that meets:
1. the center point of frame is within scanning zone, and
2. difference of roll orientation component is less than threshold $\Delta\psi_{thresh}$, we calculate the Euclidean distance between the center point of the current frame and the those encoded frames. At the end, the chosen reference frame is the frame with minimum value of Euclidean distance among the others.

Early Inter or Intra Prediction Determination

The video encoding process can be divided into 4 parts which include: partitioning, prediction, transform/quantization and entropy encode. Prediction enables higher compression rates by taking advantage from spatial (intra) or temporal (inter) redundancy between neighboring frames enabling higher compression rates.

The previous process, Reference picture selection produces n number of reference frames. This allows the use of information contained in the reference frame to encode current processed frames. Based on FIG. 12, there are three condition:
  (a) fully inter prediction mode,
  (b) partially inter and partially intra prediction mode and
  (c) fully inter prediction mode.

The first condition (a) occurs when there is a n reference frame that covers all parts of the current processed frame. Thus, all information from the current frame can be represented by the information in the reference frame by using the inter frame method. This is the best condition where the result of the video encoding will have a higher compression rate.

The second condition (b) requires a frame to use a different frame prediction method, inter and intra prediction.

This happens because the reference frames specified during the reference picture selection process are unable to cover all parts of the current processed frame. Therefore, in this condition, the uncovered parts will be processed using intra mode while the part covered by the reference frame will be encoded using inter mode.

The last condition (c) is the worst condition because in the reference picture selection process, the current frame fails to find an encoded frame that is eligible to be used as a reference. This may occur because there is no encoded frame where the center point is located in the scanning zone. The difference in roll orientation component that is too large can also be the cause of not finding reference frames. Thus, it is causing the current frame to be processed fully using intra mode or even worse is processing without reference at all which results in a low compression rate.

However, whatever conditions will occur, (a), (b) or (c), the positive points that can be taken from the use of IMU data for video encoding is that we can reduce the time needed by a frame to determine what prediction mode/method needs to be used to encode the current processed frame. The existing video encoding solution takes quite a long time and a fairly large computational load such as AMVP (double check), to determine the prediction mode that will be used in video encoding.

Motion Search Starting Point Determination

Motion search starting point determination is one of video encoding process that has a purpose to accurately choose the starting location of the reference block on the reference frame. In the current video encoding process, the starting point of motion search is determined based on the neighboring block (AMVPs). Because there's no strong correlation between the currently processed and the chosen reference block, the starting point of motion search could be less accurate. It causes computing overhead and latency due to inefficient motion vector search process. Accordingly, the correlations between IMU data and rendered VR images are contemplated to improve the efficiency in deciding starting points on the motion search process.

The process of motion search starting point determination based on IMU can be seen in FIG. 13. This process is only executed if the reference frame is found in the previous process (reference picture selection). Determining the starting point of the motion search can be illustrated as in FIG. 14. In FIG. 14 discloses currently processed frame and reference frame. Based on the FIG. 14, we also can see there is an overlapped region. This overlapping area is the best candidate to be used as a reference in the process of motion prediction. Therefore, starting point of motion search can be determined from the overlapping area information between the current processed frame and the reference frame.

The motion search algorithm starts the search process from top-left to right-bottom of the search area as depicted in FIG. 15. It iterates every block within the determined search range and calculates the sum of absolute difference (SAD) between currently processed block and all blocks into the search zone. The block with minimum SAD will be chosen as the motion vector predictor to encode current processed block. Based on these facts, our proposed solution determines the starting point of motion search by calculating the top-left point of the overlapped zone between the reference frame and currently processed frame.

In calculating the top-left position of the overlapped zone we separate the x and y axis components. In FIG. 14, x and y components of overlapped zone are represented by $x_{curr,ref}$ and $y_{curr,ref}$ respectively. The center point of current ($x_{curr}$, $y_{curr}$) and reference ($x_{ref}$, $y_{ref}$) video frames are also used to derive the top-left position of overlapped zone. Based on the current and reference frame position and x-y axis components, we divided the calculation become 4 cases:

X-Axis Component (1) Current frame is located more right-side than the reference frame ($x_{curr} \geq x_{ref}$).

Example

Let's assume the width of video frame is 1280. The center point of current and reference frames is (800, Y) and (0, Y). This example can be illustrated as in FIG. 16(a).

$x_{curr,ref}$ is the result of a subtraction operation between $x_{curr}$ and half of video frame width. Therefore, for this example $x_{curr,ref}$ will be 160 (800 minus 640).

(2) Current frame is located more left-side than the reference frame ($x_{curr} < x_{ref}$).

Example

Let's assume the width of video frame is 1280. The center point of current and reference frames is (0, Y) and (800, Y). This example can be illustrated as in FIG. 16(b).

$x_{curr,ref}$ is the result of a subtraction operation between $x_{ref}$ and half of video frame width.

Y-Axis Component (3) Current frame is located more above the reference frame ($y_{curr} \geq y_{ref}$).

Example

Let's assume the height of video frame is 640. The center point of current and reference frames are (X, 500) and (X, 0). This example can be illustrated as in FIG. 17(a).

$y_{curr,ref}$ is the result of a addition operation between $y_{ref}$ and half of video frame height. Therefore, for this example $y_{curr,ref}$ will be 320 (0 plus 320).

(4) Current frame is located below the reference frame ($y_{curr} < y_{ref}$).

Example

Let's assume the height of video frame is 640. The center point of current and reference frames are (X,0) and (X,500). This example can be illustrated as in FIG. 17(b).

$y_{curr,ref}$ is the result of a addition operation between $y_{curr}$ and half of video frame height.

As explained, the motion search starting point is the top-left of the overlapping area between the reference frame and the current frame. Based on the previous examples, top-left position of overlapping area can be calculated using the equation 7 and 8 for x-axis and y-axis respectively. The followings are the explanations for equation 7 and 8.

$x_{curr}$ and $y_{curr}$: the coordinate position of current video frame center point $x_{ref}$ and $y_{ref}$: the coordinate position of reference video frame center point Width: the width of video frame size
Height: the height of video frame size $x_{curr,ref}$ and $y_{curr,ref}$: the coordinate position of motion search starting point $$x_{curr,ref} = \begin{cases} x_{curr} - \left(\frac{\text{Width}}{2}\right), & x_{curr} \geq x_{ref} \\ x_{ref} - \left(\frac{\text{Width}}{2}\right), & x_{curr} < x_{ref} \end{cases} \quad [\text{Math.7}]$$

$$y_{curr,ref} = \begin{cases} y_{curr} + \left(\frac{\text{Height}}{2}\right), & y_{curr} \geq y_{ref} \\ y_{ref} + \left(\frac{\text{Height}}{2}\right), & y_{curr} < y_{ref} \end{cases} \quad [\text{Math.8}]$$

Motion Search Window Size Determination

A motion search Algorithm is a way of locating matching macroblocks in a sequence of digital video frames for the purposes of motion estimation as depicted in FIG. 18. This can be used to discover temporal redundancy in the video sequence, increasing the effectiveness of inter-frame video compression. The algorithm involves dividing the current frame of a video into macroblocks and comparing each of the macroblocks with a corresponding block within the search area in the previous frame. The larger search area, larger is the potential motion and the possibility for finding a good match. However, A full search of all potential blocks is a computationally expensive task.

Larger search area definitely gives more accurate results compared to the smaller one. However, not all cases require a large search area. In the case of motion estimations with large enough frame movements, it may require a large search area. but on the contrary, for frames that have little or no significant change, do not require a large search area. In virtual reality case, big movements may require larger search area to obtain the better results, but for small or even no movements it's better to not use the large search area due to its computationally expensive issues. Therefore, utilization of dynamic search range based on the screen changes in motion estimation process can make the encoding process become more efficient.

Basically, the determination of search window size is based on the overlapping area between current processed and reference frame. In FIG. 19, we can see that the size of overlapping area between reference and current frame is denoted by $\Delta x$ and $\Delta y$ for x-axis and y-axis respectively. In the previous step (3.5), starting point has been determined based on IMU difference between current and reference frame. Based on that, we may also derive and determine motion vector search window size ( $\Delta x$ and $\Delta y$ ) as expressed Equation 9 and 10. FIG. 19 is an example of determining search window size. That example has this following information.

Size of video frame (width, height)=(1280, 720)
Center point of current frame ( $x_{curr}$, $y_{curr}$ )=(960, 360)
Center point of reference frame ( $x_{ref}$, $y_{ref}$ )=(0, 0)
Motion search starting point ( $x_{curr,ref}$, $y_{curr,ref}$ )=(320, 360)

From this information we know that the current frame is located above and more right-side to the reference frame. Hence, $\Delta x$ and $\Delta y$ can be calculated as followings.

$$\Delta x = \left[x_{ref} + \frac{\text{Width}}{2}\right] - x_{curr,ref} = 0 + 640 - 320 = 320$$

$$\Delta y = y_{curr,ref} - \left[y_{curr} - \frac{\text{Height}}{2}\right] = 360 - (360 - 360) = 360$$

Since the current video encoding standard only supports square search window area, then after getting the $\Delta x$ and $\Delta y$, the search window size is determined by taking the maximum value between these values. Therefore, for the example above, the search window size value will be 360.

$$\Delta x = \begin{cases} \left[x_{curr} + \frac{\text{Width}}{2}\right] - x_{curr,ref}, & x_{curr} < x_{ref} \\ \left[x_{ref} + \frac{\text{Width}}{2}\right] - x_{curr,ref}, & x_{curr} \geq x_{ref} \end{cases} \quad [\text{Math.9}]$$

$$\Delta y = \begin{cases} y_{curr,ref} - \left[y_{ref} + \frac{\text{Height}}{2}\right], & y_{curr} < y_{ref} \\ y_{curr,ref} - \left[y_{curr} - \frac{\text{Height}}{2}\right], & y_{curr} \geq y_{ref} \end{cases} \quad [\text{Math.10}]$$

Decoding Enhancement

As stated before, video compression is important in Cloud VR. VR content must be compressed as efficiently as possible before it is transmitted to the client. The process that compresses the video at the server before sending it to the client is called encoding. On the other hand, the process that decompresses the received video at the client side before displaying the image to the user is called decoding.

Due to limited bandwidth, video compression is highly necessary yet expensive in a VR system. It consumes a lot of computing resources and makes a very huge computational burden on both server and client. Hence, the improvement and enhancement of video compression are very needed to make the VR system better.

As we explained in the previous section, there are some ways to improve the performance in the VR encoding process. The IMU data which is mostly used for orientation tracking only also can be utilized to improve the performance of the encoding process. It reduces the computational cost by pruning some unnecessary processes. Based on this approach, we are also thinking to utilize the IMU data to improve the performance of the decoding process. Even though the decoding process is not as formidable as the encoding process, the small improvement still has a notable impact on the whole VR system.

Priority-Based Block Transmission Queueing

The main idea to enhance the decoding process using IMU is the priority-based decoding method. It simply giving more priority to the part of the video frame that has not ever been encoded before. First, it clusters some adjacent CTUs (coding tree unit) into a group called block. After that, every block will be categorized as a high-priority block or low-priority block. High-priority blocks are the blocks that have never been encoded before. Otherwise, low-priority blocks are the blocks that have ever been encoded before, which means it is the overlapped region between the current-processed and the previous-encoded frames.

In order to categorize the blocks, we need to determine the overlapped region between the current and previous encoded frames by the approach in previous section. which results in the overlapped region between those frames. Then, the blocks that lie within the overlapped region will be categorized as low-priority blocks whereas the area outside will be categorized as high-priority blocks. The difference between these two block categories can be easily visually described in FIG. 20.

After categorizing the blocks, the high-priority blocks can be transmitted and decoded by the client earlier than the low-priority blocks. Hence, all the blocks in the video frame can be transmitted to the client by following the order of the queue represented in FIG. 21. The upper part of that figure is showing the difference area between high and low priority blocks. After that, they are mapped into a transmission queue before being sent to the client side to be decoded.

The reason for sending the high-priority blocks prior to the low-priority blocks is related to network latency issues. In a very bad network condition, the client may not receive all blocks information to be rendered. If this happens, it's very dangerous for the high-priority blocks since they never been decoded at the client side at all which means the client has no clue about this information. Differs from high-priority blocks, the low-priority blocks have ever been decoded previously. Although the blocks have not arrived on the rendering time, it is possible for the decoder to recover this missing information by using previously decoded frames. The details about this issue and solution will be explained more detail in the next section.

Actual FoV Calculation

The delay from Cloud VR long process (Dt) has an effect on the difference between the motion data used to process video frame encoding on the server ($IMU_{t-Dt}$) and motion data when the video frame is displayed to the user ($IMU_t$). This difference in motion data results in shifting FoV which should be displayed to VR HMD. This shifting needs to be done to prevent or reduce the occurrence of motion sickness felt by VR users.

According to this fact, this FoV shifting can be used as a consideration to determine the decoding priority of a block in a video frame. Based on FIG. 22, at the beginning of the process, the client sends $IMU_{t-Dt}$ information motion data to the server to be used as a base for VR video encoding. $IMU_{t-Dt}$ data is associated with a video frame that has been encoded and then sent alongside with the video frame. After the video frame package is received on the client side, the first thing the client does is compare the motion data value of the video frame ($IMU_{t-Dt}$) and the latest motion data readings from the current VR HMD ($IMU_t$).

Then, the calculation of the difference between $IMU_{t-Dt}$ and $IMU_t$ is done to find out the overlapping zone between original $FoV_{t-Dt}$ from server-side encoding results and actual $FoV_t$ results from the current IMU sensor reading. Determination of the overlapping zone will serve as the basis for determining the decoding priority of each block in the video frame. The blocks inside the overlapping zone are set as higher priority decoding blocks, while those outside this zone are designated as lower priority. The reason for this determination is because the blocks contained in the overlapping zone are blocks in actual FoV which will be displayed and rendered to the user.

Previously Decoded Blocks Reuse Limitation

Today's decoder algorithms benefit tremendously from temporal redundancy in the video. The most important image for the previous image. However, continuous use of temporal redundancy reference is also not good practice. In term of resource efficiency, this utilization has produced more efficient results. However, for a long period of time or in a fairly dynamic video scenario, this method is not appropriate to use.

For example, in FIG. 23, several blocks of video frames at (t), utilize temporal redundancy of the blocks contained in the video frame at (t−1). Block F, G, H in the video frame at (t) refers to non-previously decoded blocks in the video frame at (t−1). Non-previously decoded block is the block whose decoding process does not utilize temporal redundancy from any previous frames, in other words, independent block. These cases are still allowed because F, G, H blocks are the independent blocks that do not depend on any previous video frames.

On the other hand, K, L, M blocks in the video frame at (t) referring to K, L, M blocks in the video frame at (t−1) where the blocks also refer to K, L, M blocks in the video frame at (t−2). For a short period of time, the effect of this method is not that noticeable. However, for a long period of time or in a video scene that has quite dynamic changes, this method will have an impact on the non-availability of parts of the video that should have changed. This happens because the blocks in the video frame still use the same information in the previous video frame. This certainly results in a bad user experience.

Based on this fact, our proposed solution is trying to limit the continuous use of temporal redundancy by setting the priority decoding of each block in the video frame. In FIG. 23, the blocks are classified into 2 groups, high-priority blocks, and low-priority blocks. High-priority blocks are blocks that are prioritized to be processed in advance because there is no previous video frame that can be used as a reference for those particular blocks. While low-priority blocks are the blocks that have references to the previously decoded video frame.

In video frames at (t) F, G, H, blocks and K, L, M, blocks are actually the blocks that can refer to the previous video frame. Hence, these blocks can be categorized as low-priority blocks. However, if we look at K, L, M blocks, the reference of this block (video frame at t-1) also uses previous blocks of reference (video frame at t-2). As explained at the beginning of this section, the continuous use of temporal redundancy is not appropriate. Therefore, blocks K, L, M in the video frame at (t) are specified as high-priority blocks, in order to prevent these blocks from referring to the blocks in the previously decoded video frames.

Block-Based Asynchronous Time Warping

Ideally, the rendering engine would render an image using the measured IMU data immediately before the image is displayed on the screen. However, in fact, the rendering takes the time that cause the rendering engine only uses a pose reading that is a few milliseconds before the image is displayed on the screen. During these few milliseconds, if the head moves, it will display the image that lags a little bit after the actual pose reading.

The time-warping (TW) quickly translates the image a little bit based on how much the head rotated between the time the render engine used the head rotation reading and the time the time warping begins. The render engine renders the image and then when the render has done, the time-warp is quickly applied to the resultant image. However, there is a possibility that the render engine takes more time than is available between frames. This issue can be handled by another version of time warping, called asynchronous time-warping (ATW). ATW takes the last available frame and applies time-warping to it. If the renderer has not finished in time, ATW takes the previous frame and applies time-warping to it. If the previous frame is taken, the head probably rotated even more, so the greater shift is required.

In ATW, there is a possibility that some parts of the screen will be blank because those are not covered by the previous frame. This happens because ATW simply shifts the previous screen only without any additional computation regarding the actual current image frame. Instead of considering the information of the current actual video frame, the current ATW system simply discards it and use the previous video frame to be displayed. In this section, we are trying to solve this ATW issues by using priority-based block decoding approach.

As shown in FIG. 24, a video frame consists of two kinds of blocks, the high-priority and low-priority blocks. As explained in the previous section, we proposed the video transmission queue that makes sure the high-priority blocks which are not covered by the previous decoded frame will be arrived and processed earlier on the client side. This arrived high-priority blocks can be utilized by ATW to cover its blank part of the screen.

FIG. 25 shows how the mechanism of block-based asynchronous time-warp works. Before Vsync (t-1) everything is normal, the network condition is good, all transmitted video frame blocks are well received at the client side and they are processed as the way it should be. However, the unwanted event happens afterward (Vsync (t)). The network quality deteriorates resulting in a delay in receiving the blocks of a video frame. This condition certainly results in delays in the process of decoding and rendering video frames. This unwanted event triggers the asynchronous time-warp (ATW) mechanism process to be carried out in order to maintain the quality of service of the cloud VR system.

Instead of displaying nothing to the user, ATW utilizes and shifts the previously decoded video frames based on the current user head pose reading (IMU data). The resultant images will be rendered immediately to the Client VR display in a very short amount of time. If the user moves a lot, the difference between previous and current IMU data will be very huge, it needs a larger shifting operation on the previous image. The larger shifting against the previous image will generate some "blank spot" on the screen because the previous image does not contain that information. The block-based ATW prevents that scenario to happen.

Not like normal ATW, the block-based ATW will receive and process the block with higher-priority first. These higher-priority blocks are extremely important to improve ATW because they are holding the information related to the ATW "blank spot" issue. In FIG. 22 we can see that the high priority blocks are received and processed first. These blocks hold information that does not exist in the previous video frame. If it requires more time to display the image to the user, ATW will be carried out and the "blank spot" as the results of ATW will be filled by the received high-priority blocks. Although there is a possibility that not all high-priority blocks have arrived at the Vsync time, the ATW "blank spot" is still reduced by the number of blocks that are already arrived. Therefore, the block-based asynchronous time-warp has better performance and advantages compared to the normal ATW.

The invention claimed is:

1. An encoding acceleration method of cloud VR (virtual reality) video, the method comprising:
   obtaining a center point of a current frame as an identifier of the current frame, wherein the center point is determined according to a sensor data of IMU (Inertial Measurement Unit);
   constructing one or more reference frame candidates for encoding of the current frame based on the center point of the current frame;
   selecting a specific reference frame among the one or more reference frame candidates based on the sensor data of IMU;
   selecting a prediction mode for encoding the current frame based on information included in the specific reference frame; and
   encoding the current frame based on the selected prediction mode,
   wherein the IMU includes at least one of accelerometers, gyroscopes, and magnetometers.

2. The method of claim 1,
   wherein a rotation orientation of the one or more reference frame candidates and a rotation orientation of the current frame are same.

3. The method of claim 1,
   wherein the specific reference frame is a frame having a minimum Euclidean distance from the current frame among the one or more reference frame candidates.

4. The method of claim 3,
   wherein a difference between a roll of the specific reference frame and a roll of the current frame is less than a preset threshold.

5. The method of claim 1,
   wherein the one or more reference frame candidates are composed of one or more frames having a center point within a scanning zone, wherein the scanning zone corresponds to twice a height of the current frame and twice a width of the current frame.

6. The method of claim 1,
wherein the selecting a prediction mode for encoding the current frame based on information included in the specific reference frame comprising:
selecting a specific reference block among blocks of the specific reference frame corresponding to a specific current block among blocks of the current frame;
encoding the specific current block based on a motion vector of the specific reference block.

7. The method of claim 6,
wherein the specific reference block is one of blocks of an overlapping region between the current frame and the specific reference frame.

8. The method of claim 7,
where the specific reference block is a block having a smallest SAD (Sum of Absolute Difference) among SADs of blocks of the overlapping region,
wherein the SADs are calculated from an upper-left block among blocks of the overlapping region.

9. An encoding acceleration device performing an encoding acceleration method of a cloud VR (Virtual Reality) video, the encoding acceleration device comprising:
a processor,
wherein the processor is configured to:
obtain a center point of a current frame as an identifier of the current frame, wherein the center point is determined according to a sensor data of IMU (Inertial Measurement Unit),
construct a one or more reference frame candidates for encoding of the current frame based on the center point of the current frame,
select a specific reference frame among the one or more reference frame candidates based on the sensor data of IMU,
select a prediction mode for encoding the current frame based on information included in the specific reference frame,
encode the current frame based on the selected prediction mode,
wherein the IMU includes at least one of accelerometers, gyroscopes, and magnetometers.

10. The device of claim 9,
wherein a rotation orientation of the one or more reference frame candidates and a rotation orientation of the current frame are same.

11. The device of claim 9,
wherein the specific reference frame is a frame having a minimum Euclidean distance from the current frame among the one or more reference frame candidates.

12. The device of claim 11,
wherein a difference between a roll of the specific reference frame and a roll of the current frame is less than a preset threshold.

13. The device of claim 9,
wherein the one or more reference frame candidates are composed of one or more frames having a center point within a scanning zone,
wherein the scanning zone corresponds to twice a height of the current frame and twice a width of the current frame.

14. The device of claim 9,
wherein the processor selecting a prediction mode for encoding the current frame based on information included in the specific reference frame comprising:
selecting a specific reference block among blocks of the specific reference frame corresponding to a specific current block among blocks of the current frame;
encoding the specific current block based on a motion vector of the specific reference block.

15. The device of claim 14,
wherein the specific reference block is one of blocks of an overlapping region between the current frame and the specific reference frame.

16. The device of claim 15,
where the specific reference block is a block having a smallest SAD (Sum of Absolute Difference) among SADs of blocks of the overlapping region,
wherein the SADs are calculated from an upper-left block among blocks of the overlapping region.

* * * * *